US011016558B2

(12) United States Patent
Sugihara et al.

(10) Patent No.: US 11,016,558 B2
(45) Date of Patent: May 25, 2021

(54) INFORMATION PROCESSING APPARATUS, AND INFORMATION PROCESSING METHOD TO DETERMINE A USER INTENTION

(71) Applicant: SONY CORPORATION, Tokyo (JP)

(72) Inventors: Kenji Sugihara, Kanagawa (JP); Mari Saito, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/482,060

(22) PCT Filed: Dec. 15, 2017

(86) PCT No.: PCT/JP2017/045116
§ 371 (c)(1),
(2) Date: Jul. 30, 2019

(87) PCT Pub. No.: WO2018/154933
PCT Pub. Date: Aug. 30, 2018

(65) Prior Publication Data
US 2020/0057486 A1  Feb. 20, 2020

(30) Foreign Application Priority Data
Feb. 23, 2017 (JP) .............................. JP2017-032317

(51) Int. Cl.
*G06F 3/01*   (2006.01)
*G06F 3/16*   (2006.01)
*G06T 11/00*  (2006.01)
(52) U.S. Cl.
CPC .............. *G06F 3/011* (2013.01); *G06F 3/165* (2013.01); *G06T 11/00* (2013.01)

(58) Field of Classification Search
CPC .......... G06F 3/011; G06F 3/165; G06T 11/00
See application file for complete search history.

(56) References Cited

U.S. PATENT DOCUMENTS

2016/0026253 A1\* 1/2016 Bradski ................ H04N 13/344
345/8
2016/0109947 A1\* 4/2016 George-Svahn .... G06F 3/03547
345/156

FOREIGN PATENT DOCUMENTS

JP   2013-196158 A   9/2013

OTHER PUBLICATIONS

International Search Report and Written Opinion of PCT Application No. PCT/JP2017/045116, dated Mar. 20, 2018, 9 pages of ISRWO.

\* cited by examiner

*Primary Examiner* — Lisa S Landis
(74) *Attorney, Agent, or Firm* — Chip Law Group

(57) ABSTRACT

To provide an information processing apparatus, an information processing method, and a program capable of grasping a user intention more accurately. An information processing apparatus includes: an accuracy acquisition unit configured to acquire accuracy information regarding a user intention to a target, the accuracy information being estimated on the basis of an action-recognition result of a user; and a response-induction control unit configured to perform response-induction control of imparting an effect according to the acquired accuracy information, to the target.

12 Claims, 17 Drawing Sheets

USER: WALK WITH LINE-OF-SIGHT TOWARD PRODUCT, BUT NO CHANGE IN WALKING SPEED

USER: INDICATION OF POSITIVE RESPONSE (CONFIRMATION OF INTEREST ESTIMATION)

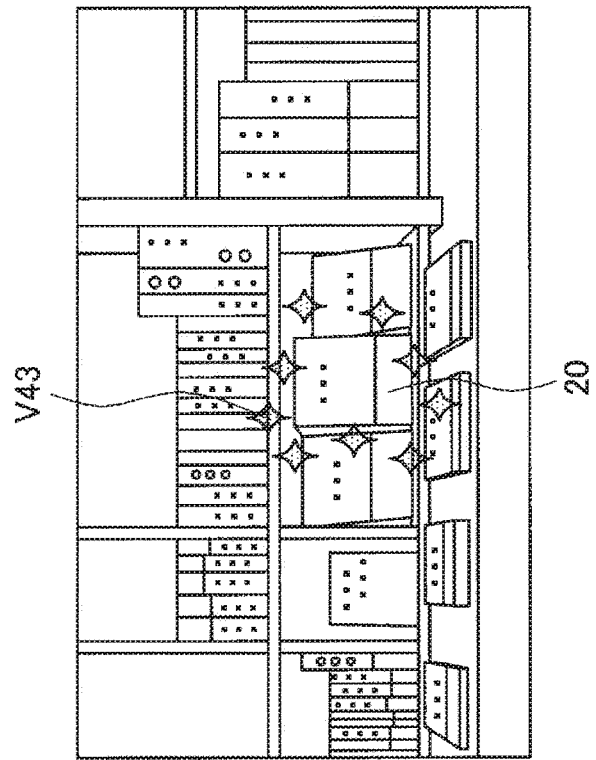
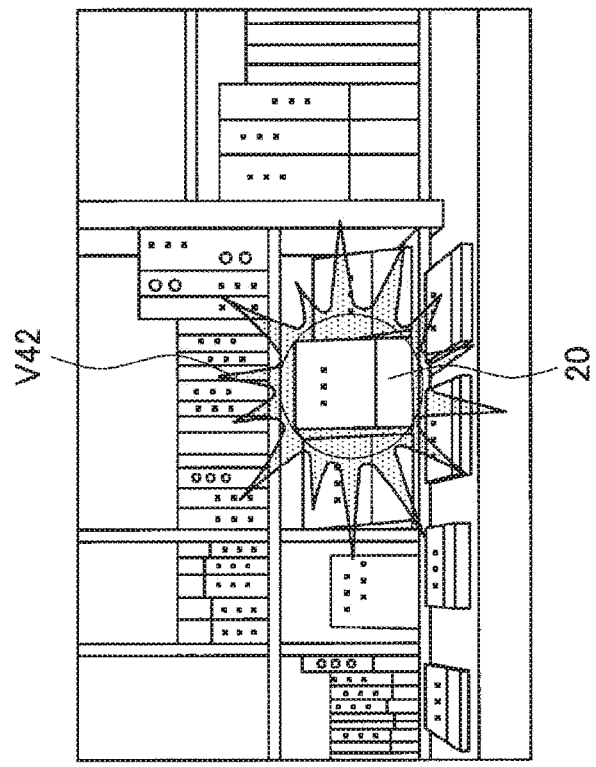
FIG. 6

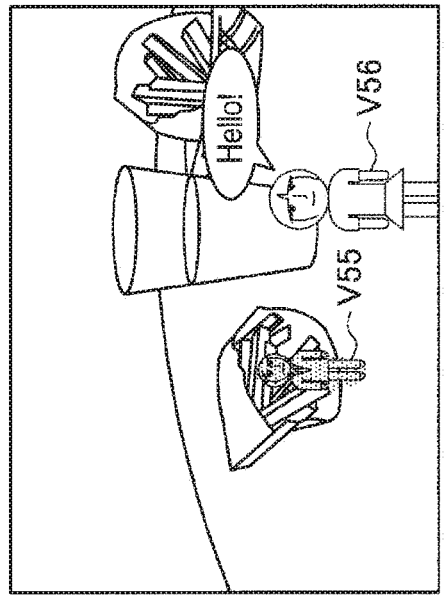
FIG. 14
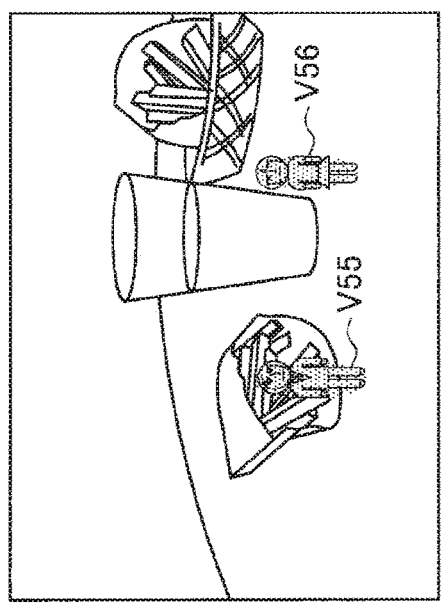

INFORMATION PROCESSING APPARATUS, AND INFORMATION PROCESSING METHOD TO DETERMINE A USER INTENTION

CROSS REFERENCE TO RELATED APPLICATIONS

This application is a U.S. National Phase of International Patent Application No. PCT/JP2017/045116 filed on Dec. 15, 2017, which claims priority benefit of Japanese Patent Application No. JP 2017-032317 filed in the Japan Patent Office on Feb. 23, 2017. Each of the above-referenced applications is hereby incorporated herein by reference in its entirety.

TECHNICAL FIELD

The present disclosure relates to an information processing apparatus, an information processing method, and a program.

BACKGROUND ART

There have been proposed various types as a user interface (UI) for operating a so-called information processing apparatus (or information processing system including the information processing apparatus) such as a personal computer (PC), a smartphone, and a tablet terminal. In particular, in recent years, various input interfaces have been proposed through the use of various analysis techniques and various recognition techniques, as well as input interfaces with devices such as a mouse and a touch panel.

For example, Patent Document 1 below discloses an exemplary technique of detecting the line-of-sight of a user. With application of such a technique, for example, there has also been considered an interface that is designated from the line-of-sight of the user for various types of information presented in a visually viewable manner to achieve an interaction between the user and an information processing apparatus.

CITATION LIST

Patent Document

Patent Document 1: Japanese Patent Laid-Open No. 2012-70081

SUMMARY OF THE INVENTION

Problems to be Solved by the Invention

However, for an interaction with a line-of-sight, an action such as a vague line-of-sight having a relatively low connection with interest has caused insufficient grasp of a user intention, thereby resulting in erroneous control.

Therefore, the present disclosure proposes an information processing apparatus, an information processing method, and a program capable of grasping a user intention more accurately.

Solutions to Problems

According to the present disclosure, there is proposed an information processing apparatus including: an accuracy acquisition unit configured to acquire accuracy information regarding a user intention to a target, the accuracy information being estimated on the basis of an action-recognition result of a user; and a response-induction control unit configured to perform response-induction control of imparting an effect according to the acquired accuracy information, to the target.

According to the present disclosure, there is proposed an information processing method, by a processor, including: acquiring accuracy information regarding a user intention to a target, the accuracy information being estimated on the basis of an action-recognition result of a user; and performing response-induction control of imparting an effect according to the acquired accuracy information, to the target.

According to the present disclosure, there is proposed a program for causing a computer to function as: an accuracy acquisition unit configured to acquire accuracy information regarding a user intention to a target, the accuracy information being estimated on the basis of an action-recognition result of a user; and a response-induction control unit configured to perform response-induction control of imparting an effect according to the acquired accuracy information, to the target.

Effects of the Invention

As described above, according to the present disclosure, a user intention can be gasped more accurately.

Note that the above effect is not necessarily limited; and in addition to or instead of the above effect, there may also be exhibited any of effects indicated in the present specification or another effect that can be grasped from the present specification.

BRIEF DESCRIPTION OF DRAWINGS

FIG. 6 is an illustration of an exemplary display for causing a user to perceive a subject for interest estimation according to the present embodiment.

FIG. 14 is an explanatory illustration of an exemplary user-intention grasping method for a plurality of subjects (virtual objects) to be candidates for interest estimation according to the present embodiment.

MODE FOR CARRYING OUT THE INVENTION

Figure 1:
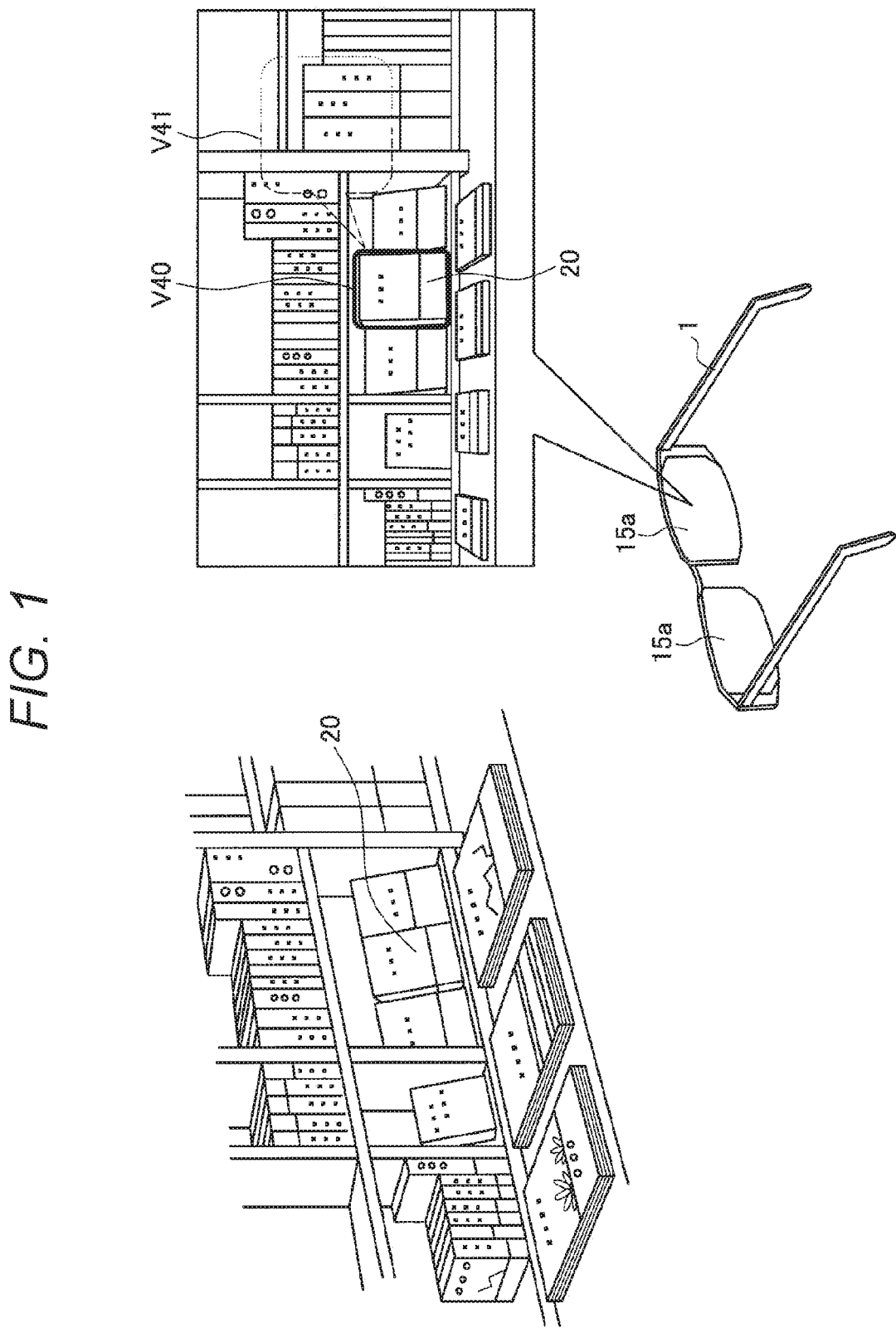
FIG. 1 is an explanatory illustration of the overview of an information processing system according to an embodiment of the present disclosure.

A preferred embodiment of the present disclosure will be described in detail below with reference to the accompanying drawings. Note that, in the present specification and the drawings, the same reference numerals are given to constituent elements having substantially the same functional configurations, and the redundant description will be omitted.

Furthermore, the description will be made in the following order.

1. Overview of Information Processing System according to Embodiment of Present Disclosure
2. Configuration of Information Processing Apparatus 1
3. Operation Processing
3-1. Interest Estimation Processing
3-2. Purpose Estimation Processing
4. Case of plurality of Subjects
5. Other Exemplary Functions
6. Supplement
7. Conclusion <<1. Overview of Information Processing System According to Embodiment of Present Disclosure>>

FIG. 1 is an explanatory illustration of the overview of an information processing system according to an embodiment of the present disclosure. The information processing system according to the present embodiment makes it possible to perform, with an information processing apparatus, optimal control according to a user intention with accurate grasp of the user intention, without an explicit inquiry to the user. Specifically, for example, an information presentation system that presents, to the user, information associated with an interest target, in confirmation of the interest target (real object) on the basis of the line-of-sight of the user, makes it possible to accurately grasp that whether the user has actually indicated interest, which target the user has indicated interest, and what a purpose of intention is (that is, what kind of information regarding the target the user desires to know), without an explicit inquiry to the user.

As an information presentation method, there is considered a superimposition display method in which in a case where the user wears a glasses-type wearable device (information processing apparatus 1) as illustrated in FIG. 1, on a subject 20 in which the user indicates interest, a virtual content (i.e., virtual object) such as a display indicating associated information is superimposed, at transmissive display units 15a each corresponding to a lens unit, with so-called augmented reality (AR) technology.

Here, for a vague line-of-sight or movement of the user, there may be performed operation control different from a user intention, such as presentation of information regarding the subject despite the user has no interest in the information, presentation of information regarding a different subject from the subject in which the user has interest, and presentation of information different from information that the user desires to know.

Therefore, the present embodiment makes it possible to accurately grasp a user intention on the basis of a response of the user to a display that induces the user's response, and to perform suitable control without an explicit inquiry to the user.

Specifically, for example, as illustrated in FIG. 1, the information processing apparatus 1 slightly displays a display V40 and a display V41 (i.e., with an effect of increasing the transparency applied) that induce a response of the user, in the periphery of the subject 20 (real object) estimated to be an interest target on the basis of an action-recognition result of the user. The display V40 is, for example, a display for facilitative perception of the estimated subject 20 for the user, and the display V41 is a balloon display that presents information associated with the subject 20.

In a case where the user has indicated a response of gaze at the display V40 and the display V41, the information processing apparatus 1 confirms that the user indicates interest, and increases the visibility (example of the degree of recognition) of the display V41 to allow the information presentation. On the other hand, in a case where the user has not gazed at the display V40 and the display V41 or has indicated a rejection response, the information processing apparatus 1 can decide that the user has no interest. Thus, the information processing apparatus 1 causes the display V40 and the display V41 to fade out.

In this manner, the present embodiment makes it possible to accurately grasp a user intention on the basis of a response of the user to a display that makes perception of a subject estimated to be an interest target, without an explicit inquiry to the user.

Figure 2:
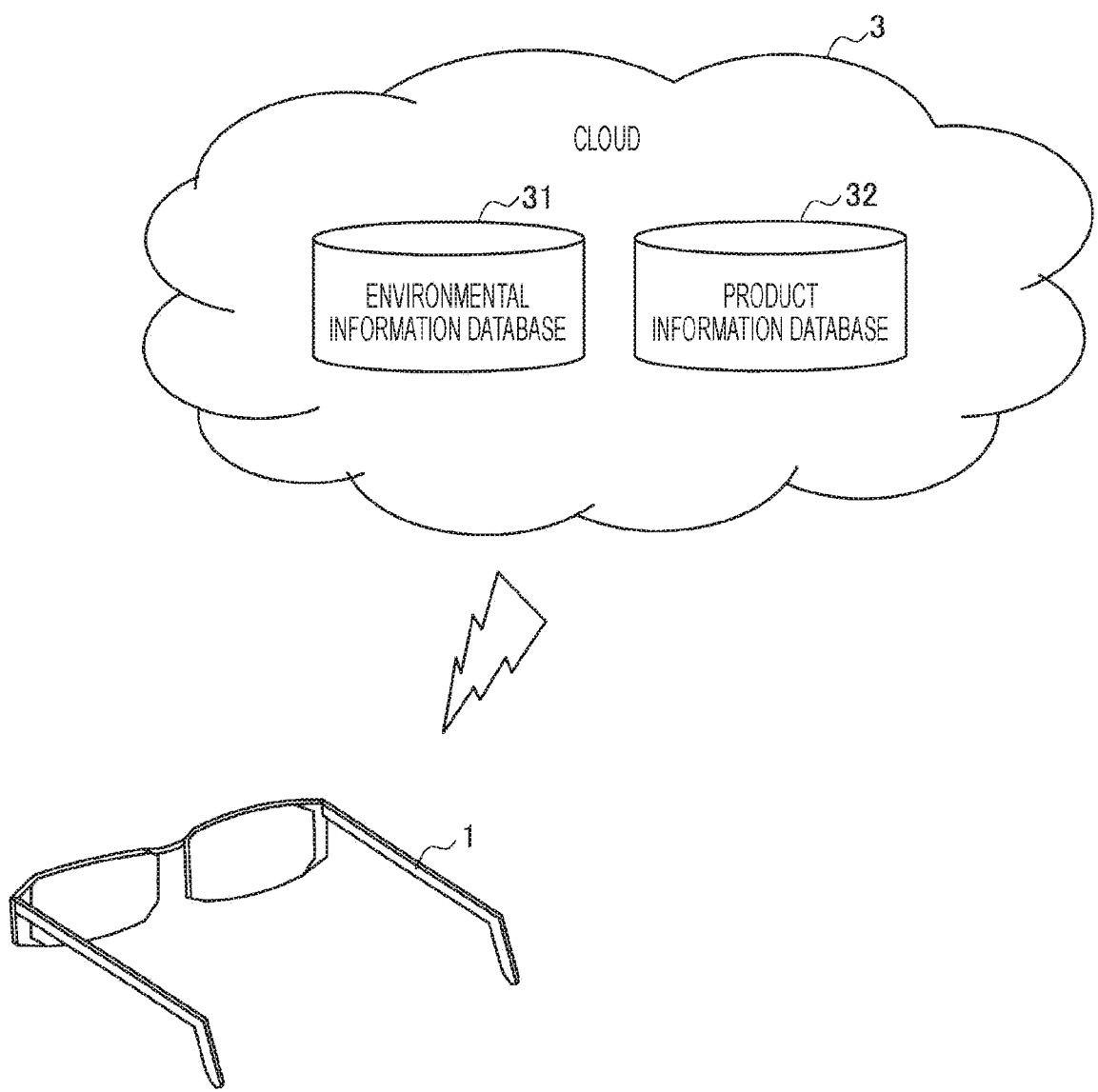
FIG. 2 is an illustration of an exemplary entire configuration of the information processing system according to the present embodiment.

Note that information associated with a subject to be presented with the information processing apparatus 1 may also be acquired from a database on a network (so-called cloud 3). FIG. 2 is an illustration of an exemplary entire configuration of the information processing system according to the present embodiment. As illustrated in FIG. 2, the information processing apparatus 1 that presents information to the user is connected to an environmental information database 31 and a product information database 32 on the cloud 3 with wireless communication, and the information processing apparatus 1 can acquire information regarding a recognized subject to present the information to the user.

The information processing system according to the embodiment of the present disclosure has been described above. Subsequently, the specific configuration of the information processing apparatus for achieving the information processing system according to the present embodiment will be described with reference to the drawings.

<<2. Configuration of Information Processing Apparatus 1>>

Figure 3:
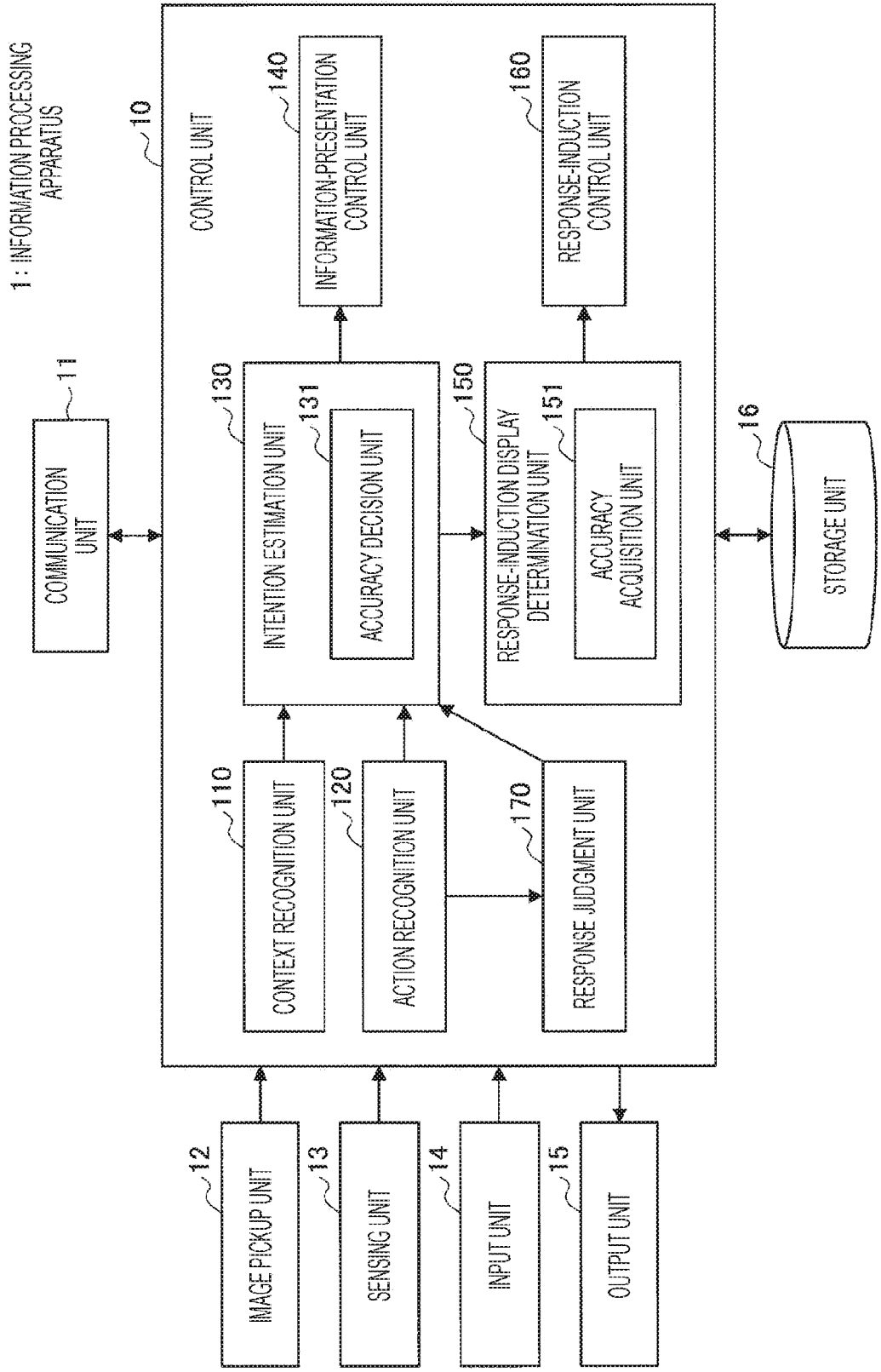
FIG. 3 is a block diagram of an exemplary configuration of an information processing apparatus according to the present embodiment.

FIG. 3 is a block diagram of an exemplary configuration of the information processing apparatus 1 according to the present embodiment. As illustrated in FIG. 3, the information processing apparatus 1 includes a control unit 10, a communication unit 11, an image pickup unit 12, a sensing unit 13, an input unit 14, an output unit 15, and a storage unit 16.

(Control Unit 10)

The control unit 10 functions as a computation processing device and a control device, and controls the overall operation in the information processing apparatus 1 in accordance with various programs. The control unit 10 is achieved with, for example, an electronic circuit such as a central processing unit (CPU) and a microprocessor. Furthermore, the control unit 10 may also include a read only memory (ROM) that stores, for example, a program and a computation parameter to be used, and a random access memory (RAM) that temporarily stores, for example, a parameter that varies suitably.

Furthermore, the control unit 10 according to the present embodiment also functions as a context recognition unit 110, an action recognition unit 120, an intention estimation unit 130, an information-presentation control unit 140, a response-induction determination unit 150, a response-induction control unit 160, and a response judgment unit 170.

The context recognition unit 110 has a function of recognizing a situation in the periphery of the user, on the basis of input data. Specifically, for example, the context recognition unit 110 can recognize a peripheral situation (for example, place where the user is present (e.g., home, shop, or company), and what is present in the periphery), on the basis of, for example, current location information and date-and-time information (season, morning, midday, or night) sensed with the sensing unit 13, or a pickup image captured with the image pickup unit 12 and environmental information obtained from sound information collected with the input unit 14. Furthermore, the context recognition unit 110 can also acquire environmental information (e.g., bookstore, movie theater, or station) correlated to a location, from the environmental information database 31 on the cloud 3.

The action recognition unit 120 has a function of recognizing an action, on the basis of various types of data in which an action of the user has been sensed. Specifically, for example, the action recognition unit 120 analyzes a pickup image captured with the image pickup unit 12, various types of sensing data sensed with the sensing unit 13 (e.g., location information, accelerometer data, and gyro sensor data), or sound information or the like input from the input unit 14, and recognizes the face orientation, line-of-sight, hand movement, and posture (bone tracking) or action mode (e.g., walking, sitting, running, or on a train) of the user. The analysis algorithm for action recognition is not particularly limited, and existing techniques can be used. Note that various types of data may be received from an external device provided in the periphery of the user. For example, on the basis of a distance image acquired from a distance image sensor that captures an image of the entire body of the user, the posture of the user (posture estimation with recognition of a site such as a hand, the head, or a foot) can be estimated.

The intention estimation unit 130 estimates a user intention, on the basis of a situation of the user (including peripheral situation) recognized with the context recognition unit 110 and an action of the user (interaction) recognized with the action recognition unit 120. In the present specification, estimation of a user intention indicates estimation of what (subject) the user has indicated interest in for what purpose (in a narrow sense of intention). At this time, the intention estimation unit 130 evaluates, with an accuracy decision unit 131, on intention estimation in the terms of "whether interest has been indicated actually (whether interaction indicating the interest has been performed)", "on which target the interaction has been performed", and "for what purpose the interaction has been performed". The evaluation is calculated as, for example, accuracy information indicated with 0 to 1 (a numerical value indicating the likelihood of the estimated intention).

For example, in a case where an interaction of pickup of a product by the user at a sales floor has been recognized, the intention estimation that the user has indicated interest in the product has a higher accuracy. However, for an interaction that, for example, the user stops moving in front of the product, it is uncertain whether or not the user has actually indicated interest in the product at the sales floor, so that the intention estimation has a lower accuracy. Furthermore, for pointing at something while saying "That is", if the user clearly points at a subject, the intention estimation that the user had indicated interest in the subject has a higher accuracy. However, for unclearly pointing at the subject, the intention estimation has a lower accuracy. Note that calculation of the accuracy of intention estimation with the accuracy decision unit 131 may be calculated on the basis of a decision pattern stored in advance, or may be calculated with machine learning based on feedback from the user.

The information-presentation control unit 140 controls to present information associated with a specific subject, in accordance with an intention estimated with the intention estimation unit 130. Information presentation may be performed from the display units 15*a* each as an exemplary output unit 15, or may be performed from an audio output unit (microphone) as an exemplary output unit 15. Furthermore, the information-presentation control unit 140 can acquire information associated with a subject, from the product information database 32 on the cloud 3. For example, in a case where a subject is a book, the information-presentation control unit 140 acquires information associated with the book (e.g., author, outline, review, and price), on the basis of information regarding the cover read with image recognition. Furthermore, the associated information can also be acquired with recognition of the barcode of the book.

The response-induction determination unit 150 acquires, with an accuracy acquisition unit 151, the accuracy information regarding the user intention calculated with the accuracy decision unit 131 of the intention estimation unit 130, determines a response-induction effect to be imparted to a subject in accordance with the accuracy information, and outputs the details of the determination to the response-induction control unit 160. A response-induction effect indicates a display that induces a response of the user (also referred to as a response-induction display) to be imparted to a target in order to estimate a user intention more accurately. For example, the display V40 that makes perception of the subject 20 estimated to be an interest target and the balloon display V41, as illustrated in FIG. 1 are assumed. Furthermore, an effect according to the visibility corresponding to the accuracy may be applied to the display V40 and the display V41. The response-induction determination unit 150 sets the visibility lower as the accuracy is lower, and adds an effect of increasing the transparency of the display V40 and the display V41.

The visibility may be expressed numerically, or may be expressed in stages (first stage (hardly visible) to third stage (clear)). Here, the "visibility" for the response-induction display is used; however, this is an example, and the visibility may be an index of "easiness to notice" (hereinafter, also referred to as "degree of recognition"). Functions that can be performed on a subject are different (for example, visual presentation of associated information, visual and auditory presentation, and rough determination/indetermination of details of presentation (e.g., information and candidates)). Thus, easiness to notice may be changed or may not be changed, continuously. For example, in a case where a visual presentation with the details of presentation roughly determined can be performed on a subject, there can be performed response-induction display control that continuously changes the transparency of the visual presentation, in accordance with the accuracy. Meanwhile, for a number of items included in the details of presentation, the items cannot be changed continuously. Thus, the degree of recognition according to the accuracy may be expressed in three stages or the like and the items may be mapped to make a state transition.

The response-induction control unit 160 controls to output the response-induction display determined with the response-induction determination unit 150. Specifically, for example, as illustrated in FIG. 1, at the transmissive display units 15a, the response-induction control unit 160 controls to display the display V40 and the display V41 at positions each corresponding to the subject 20 (real object), with the AR technology.

The response judgment unit 170 judges a response of the user to the response-induction display, and outputs the result of judgment to the intention estimation unit 130. Specifically, for example, the response judgment unit 170 judges whether the user has indicated a positive response or a negative response to the response-induction display, on the basis of, for example, the line-of-sight, head orientation, expression, and gesture of the user recognized with the action recognition unit 120. For example, the response judgment unit 170 judges a positive response for gaze at the response-induction display by the user, or a negative response for averting of the line-of-sight of the user. The accuracy is updated (increased/decreased) in the intention estimation unit 130, on the basis of the result of the response by the response judgment unit 170. Note that such a negative and positive judgment with the response judgment unit 170 may also be performed with machine learning.

(Communication Unit 11)

The communication unit 11 is connected to the network wiredly or wirelessly, and transmits data to and receives data from the environmental information database 31 and the product information database 32 on the cloud. The communication unit 11 is connected to communicate with the network via, for example, a wired/wireless local area network (LAN), or Wi-Fi (registered trademark), a mobile communication network (long term evolution (LTE), 3G (third generation mobile communication system), and the like).

(Image Pickup Unit 12)

The image pickup unit 12 has, for example, a lens system including an image pickup lens, a drive system that drives the lens system, and a solid-state image pickup element array that photoelectrically converts image pickup light obtained at the lens system to generate an image pickup signal. The solid-state image pickup element array may be achieved with, for example, a charge coupled device (CCD) sensor array or a complementary metal oxide semiconductor (CMOS) sensor array. The image pickup unit 12 may include a first image pickup unit that has an image pickup lens outward and captures the periphery of the user while the user is wearing the information processing apparatus 1, and a second image pickup unit that has another image pickup lens inward and captures the periphery of an eye of the user.

(Sensing Unit 13)

The sensing unit 13 includes various sensors for sensing an action of the user. For example, the sensing unit 13 includes, for example, an accelerometer, a gyro sensor, a geomagnetic sensor, a myoelectric sensor (sensing of an eye potential to be used for line-of-sight detection), a biosensor, a location sensor, and an environmental sensor. The location sensor may be a global positioning system (GPS) capable of positioning outdoor, or may be capable of positioning indoor that senses a location with transmission and reception with Wi-Fi (registered trademark), Bluetooth (registered trademark), a mobile phone, a personal handyphone system (PHS), a smartphone or the like, or through short distance communication and the like.

(Input Unit 14)

The input unit 14 serves an interface that senses input information to the information processing apparatus 1 and outputs the information to the control unit 10. For example, the input unit 14 is achieved with an operation input unit, an audio input unit (microphone), or the like. The operation input unit may have a physical configuration such as a button, a switch, and a lever. The audio input unit makes it possible to perform input with a voice of the user.

(Output unit 15)

The output unit 15 is achieved with a display unit that outputs an image and text, or an audio output unit (speaker) that outputs sound. In a case where the information processing apparatus 1 is a glasses-type wearable device as illustrated in FIG. 1, the transmissive display units 15a are provided at positions corresponding to lens units.

(Storage Unit 16)

The storage unit 16 is achieved with a read only memory (ROM) that stores, for example, a program and a computation parameter to be used for processing by the control unit 10, and a random access memory (RAM) that temporarily stores, for example, a parameter that varies suitably.

The configuration of the information processing apparatus 1 according to the present embodiment has been specifically described above. Note that the configuration of the information processing apparatus 1 is not limited to the example illustrated in FIG. 3. For example, at least part of the functional configuration of the control unit 10 may be provided on a server and may be included in a client server system. Furthermore, the information processing apparatus 1 is not limited to the glasses-type wearable device as illustrated in FIG. 1, may be a band-type, earphone-type, headphone-type, or necklace-type wearable device, may also be a head mounted display (HMD), or may be a mobile terminal such as a smartphone, a mobile phone terminal, a tablet terminal, a music player, a mobile terminal, or a game console.

<<3. Operation Processing>>

Subsequently, operation processing of the information processing system according to the present embodiment will be specifically described with the drawings. For the present embodiment, specifically as user intention estimation, first, interest estimation is performed (estimation whether or not interest in something has been indicated), and in a case where the interest estimation has been confirmed (likelihood of indication of interest in something is a predetermined or more), purpose estimation (estimation of what purpose) is performed. Then, in a case where the purpose estimation is confirmed, a function, such as corresponding information presentation, is performed. Note that in the confirmation process of purpose estimation, estimation and confirmation that which subject the user has indicated interest in may also be performed.

<3-1. Interest Estimation Processing>

Figure 4:
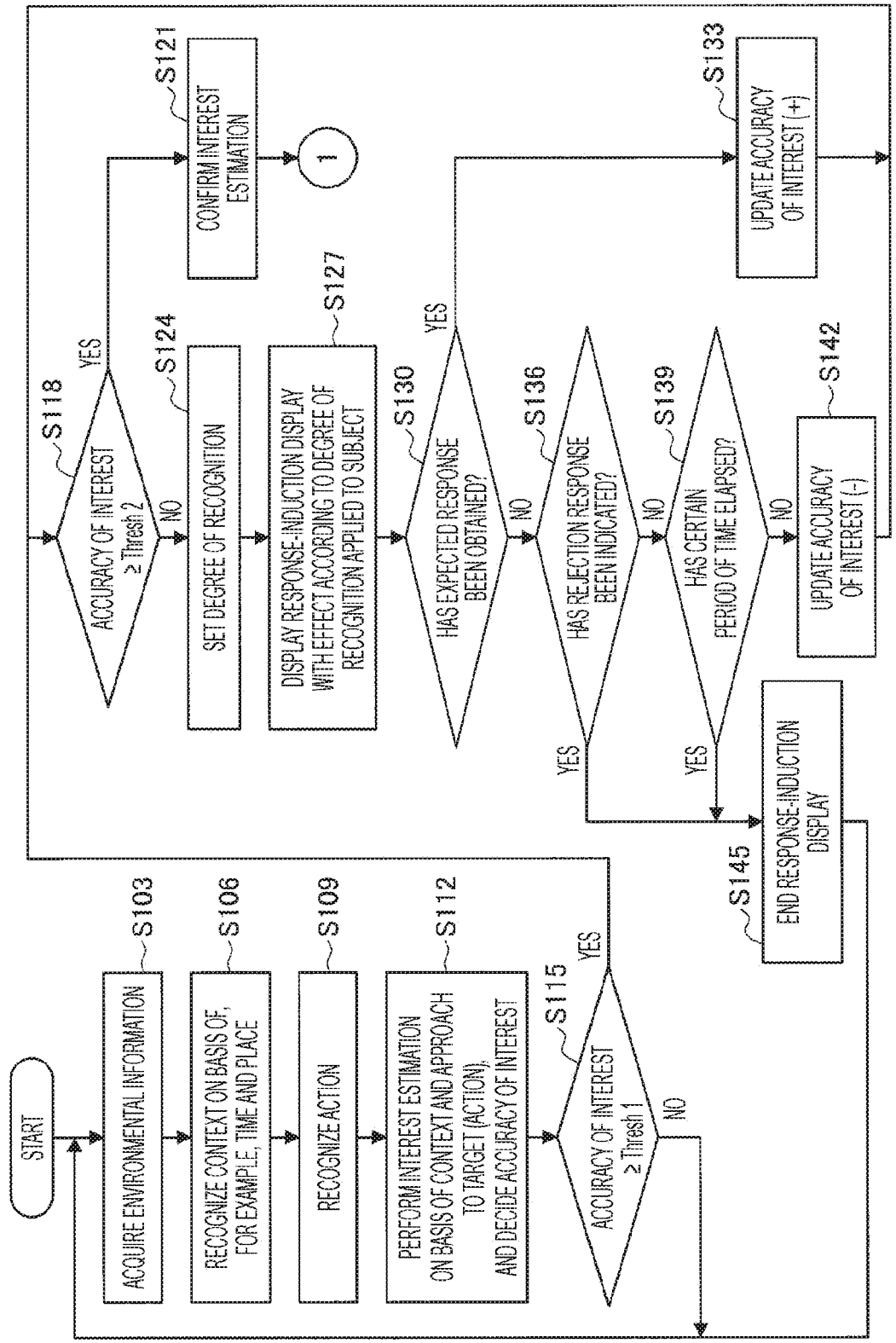
FIG. 4 is a flowchart of interest estimation processing with the information processing apparatus of the present embodiment.

First, interest estimation processing will be described with reference to FIG. 4. FIG. 4 is a flowchart of interest estimation processing with the information processing apparatus 1 of the present embodiment.

As illustrated in FIG. 4, first, the context recognition unit 110 of the information processing apparatus 1 acquires environmental information regarding the periphery of the user (step S103). The environmental information may also be acquired, from corresponding environmental information, from the environmental information database 31, on the basis of, for example, location information regarding the user, or may also be acquired on the basis of analysis of a peripheral pickup image captured with the image pickup unit 12 or analysis of peripheral sound information collected with the input unit 14. Thus, for example, information regarding a peripheral place where the user is currently present can be obtained. Specifically, for example, there is acquired information such as the presence of the user in a bookstore, and furthermore, classification of bookshelves near the user, and what kind of books in the bookshelves.

Next, the context recognition unit 110 recognizes a user context (i.e., situation of the user) from, for example, time and a place (step S106). The user context can be recognized on the basis of, for example, a peripheral pickup image captured with the image pickup unit 12, movement of the user (specifically, action mode) sensed with the sensing unit 13, sound information input with the input unit 14, and the environmental information acquired in the above step S103. Specifically, for example, in a case where the user intends to get on an elevator during a daytime, there can be recognized a situation of having lunch outside.

Next, the action recognition unit 120 recognizes an action of the user (step S109). For example, action recognition recognizes movement of the line-of-sight, head orientation, movement (e.g., walking, running, sitting, or on a train), and hand movement of the user. Such action recognition also recognizes approach to a specific subject. For example, there is recognized an action of the user, such as stop and pickup of a book, stop in front of a bookshelf, looking at a bookshelf, and pointing at a specific subject.

Next, the intention estimation unit 130 estimates, on the basis of the recognized context and approach to a target (action of the user), the presence or absence of interest of the user (whether or not the user has indicated interest in a specific subject), and then decides the accuracy of interest (likelihood of the interest estimation) with the accuracy decision unit 131 (step S112). The accuracy of interest is calculated, for example, with a score of 0 to 1. For example, for pickup of a book in a bookstore, the likelihood of interest in the book is higher, and for example, the accuracy of interest is calculated to be 1.0. On the other hand, for just stop in front of a certain bookshelf, it is unclear that the user stops with interest in the bookshelf or stops in front of the bookshelf by chance due to another factor. Thus, the accuracy of interest is calculated to be 0.6, for example. Although the calculation algorithm for the accuracy of interest is not particularly limited. For example, the accuracy of interest may be calculated in accordance with a pre-registered rule, or may be calculated with machine learning.

Next, the response-induction determination unit 150 decides whether or not the accuracy of interest is a predetermined first threshold (hereinafter, referred to as "threshold Th1") or more. For example, in a case where the threshold Th1 is 0.5 and the accuracy of interest is less than 0.5 (step S115/No), the response-induction determination unit 150 decides that the current action of the user is not an action indicating interest in something, and repeat the processing from step S103.

Figure 7:
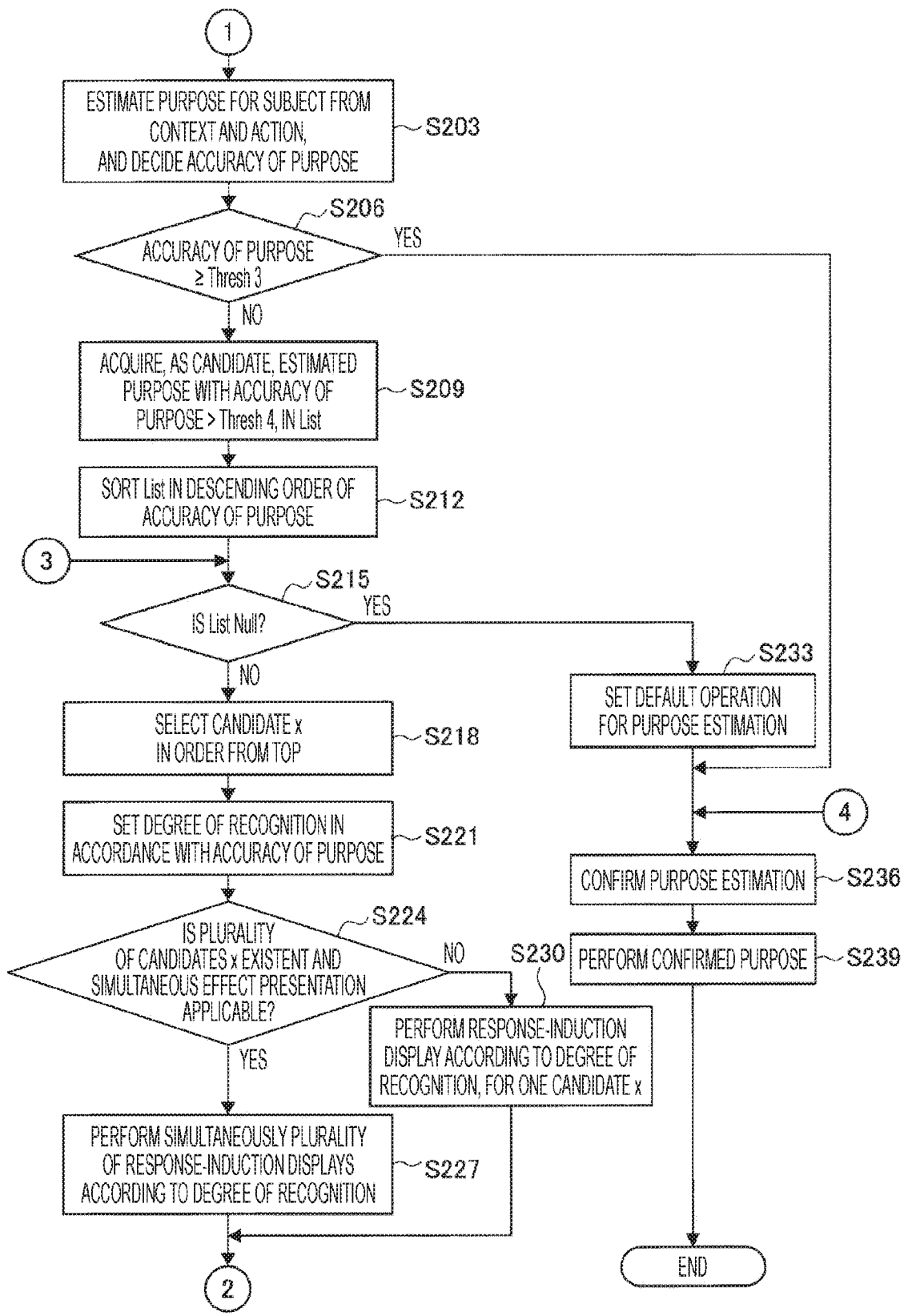
FIG. 7 is a flowchart of purpose estimation processing with the information processing apparatus of the present embodiment.
Figure 8:
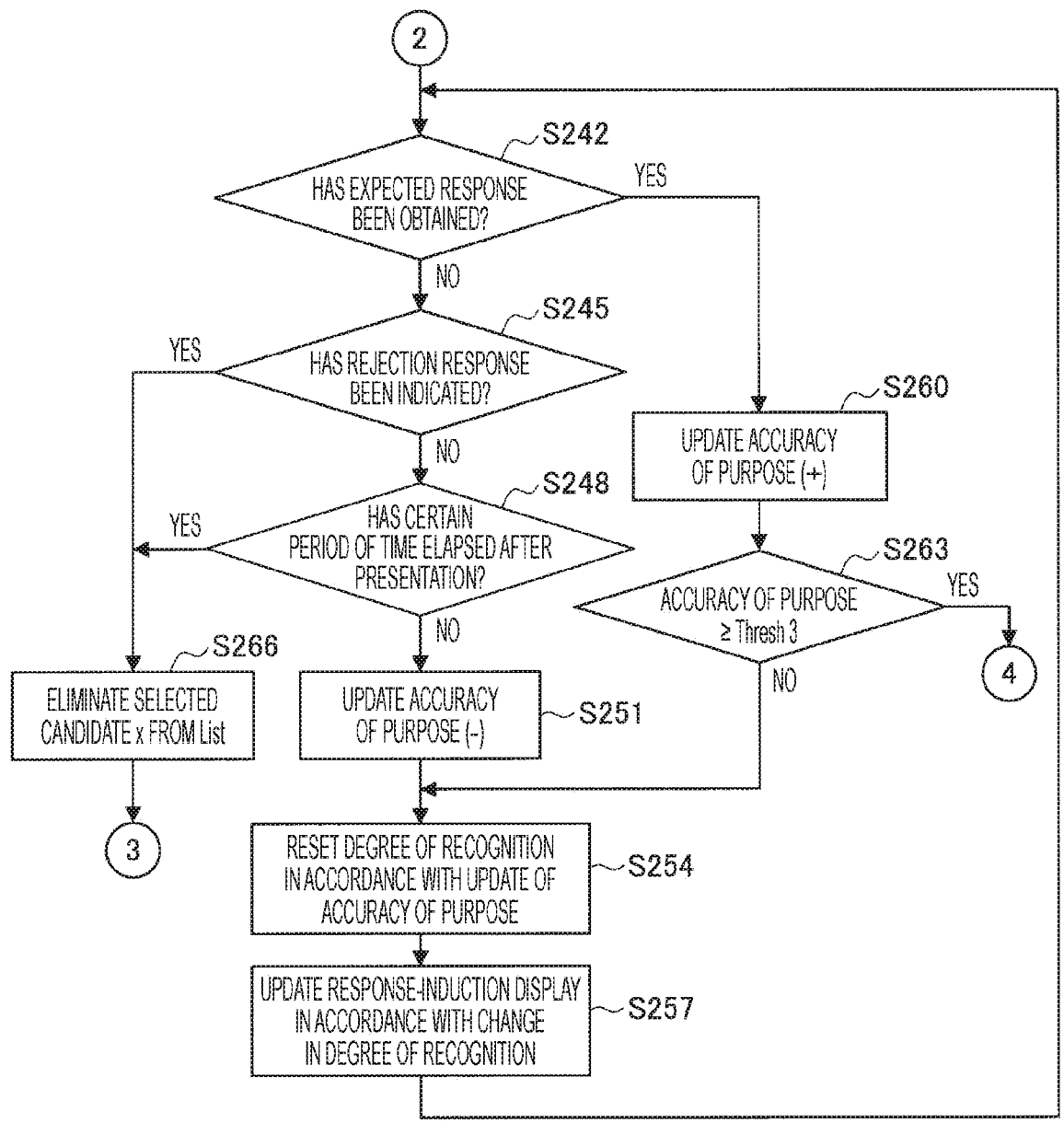
FIG. 8 is a flowchart of the purpose estimation processing with the information processing apparatus of the present embodiment.

In a case where the processing in the above steps S103 to S115 is repeated and the accuracy of interest exceeds the threshold Th1 (step S115/Yes), the response-induction determination unit 150 further decides whether or not the accuracy of interest is a predetermined second threshold (hereinafter, referred to as "threshold Th2") or more. In a case where the threshold Th2 is, for example, 1.0 and the accuracy of interest is 1.0 or more, the intention estimation unit 130 confirms the interest estimation (step S121), and then purpose estimation processing illustrated in FIGS. 7 and 8 is performed.

On the other hand, in a case where the accuracy of interest is less than the threshold Th2 (step S118/No), the control unit 10 performs response-induction display control in order to verify the presence or absence of interest of the user. Specifically, first, the response-induction determination unit 150 sets the degree of recognition (here, visibility) of a response-induction display in accordance with the accuracy of interest. The degree of recognition is set lower as the accuracy of interest is lower. In order to verify the presence or absence of interest of the user with an unobtrusive display, without making the user feel bothersome due to the response-induction display, the degree of recognition is set lower as the accuracy of interest is lower.

Next, the response-induction control unit 160 controls to display a response-induction display applied with an effect according to the degree of recognition determined by the response-induction determination unit 150, to a subject estimated to be of interest (step S127). For example, in a case where the visibility is set lower, an effect of increasing the transmittance of the response-induction display is applied to display the response-induction display slightly.

Next, the response judgment unit 170 judges whether or not an expected response to the response-induction display has been obtained from the user (step S130). An expected response indicates a predetermined positive response to a response-induction display, and, for example, "gaze at the response-induction display", and "keeping sight of the response-induction display" are assumed.

Next, the response judgment unit 170 judges whether or not a rejection response has been indicated (step S136). A rejection response is a predetermined negative response to a response-induction display, and, for example, "quick glance away despite glance at the response-induction display" and "continuous glance away from the response-induction display" are assumed.

Next, the response judgment unit 170 judges whether or not a certain period of time has elapsed without any particular response while neither a positive response nor a negative response is indicated (step S139).

Then, for no response by the user (step S130/No, S136/No), until a certain period of time elapses (step S139/No), the accuracy decision unit 131 of the intention estimation unit 130 negatively updates (reduces) the accuracy of interest (step S142). When the accuracy of interest is updated negatively, the degree of recognition is also updated negatively (step S124), and the transmittance of the response-induction display is increased (step S127).

Then, for indication of a rejection response by the user (step S136/Yes), or elapse of a certain period of time without any response (step S139/Yes), the response-induction control unit 160 ends the response-induction display (step S145). Here, FIG. 5 illustrates an exemplary display of a response-induction display according to the present embodiment.

Figure 5:
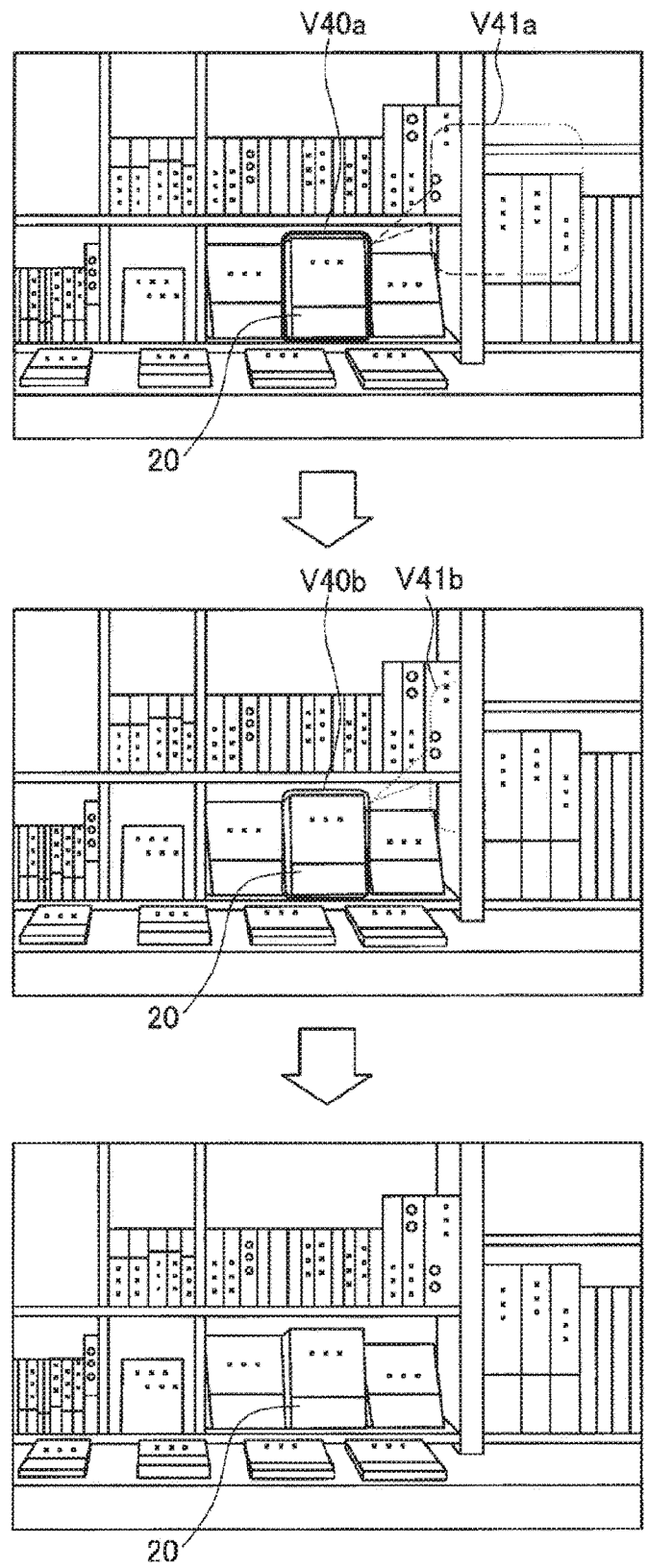
FIG. 5 is an illustration of an exemplary display of a response-induction display according to the present embodiment.

As illustrated in the upper part of FIG. 5, a display V40a that makes perception of a subject 20 and a balloon display V41a are displayed in order to induce a response, for the subject 20 that has been interest-estimated. The transparency effects of the display V40a and the balloon display V41a are controlled in accordance with the set visibility. Thus, as illustrated in the upper part of FIG. 5, the balloon display V41a is slightly displayed, thereby allowing intuitive indication to the user that the system side recognizes the subject 20 from, for example, the line-of-sight of the user and intends to present associated information.

On the other hand, for no indication of any response by the user, as illustrated in the middle part of FIG. 5, the visibility of the display V40b and the display V41b gradually decreases (due to the negative update of the accuracy of interest), and furthermore (after elapse of a certain period of time) the response-induction display ends as illustrated in the lower part of FIG. 5.

Note that a display that causes the user to perceive the subject 20 is not limited to the display with the subject 20 enclosed with a frame as the display V40a illustrated in FIG. 5, and may be, for example, a display V42 with a halo as illustrated on the left side of FIG. 6, or may be a display V43 with particles as illustrated on the right side of FIG. 6. Furthermore, although not illustrated, there can also be considered a display with a subject spotlighted, or a method in which an object other than a subject for interest estimation is made to perceive hardly (e.g., superimposition of background colors or darkening) and facilitates to relatively perceive the subject. Furthermore, there has been described the case where the subject is a real object, in the present embodiment. The present embodiment, however, is not limited to the case, and in a case where the subject is a virtual object, the size or color of the object, or the distance and the like between the object and the user is changed, thereby allowing facilitative perception of the subject.

On the other hand, in a case where an expected response to the response-induction display has been obtained from the user (step S130/Yes), the accuracy decision unit 131 of the intention estimation unit 130 positively updates (increases) the accuracy of interest (step S133). As the accuracy of interest is updated positively, the degree of recognition is also updated positively (step S124), and the transmittance of the response-induction display decreases (step S127). In other words, the response-induction display slightly displayed is gradually clearly displayed in accordance with the positive response of the user, and when the accuracy of interest exceeds the threshold Th2 (step S118/Yes), the interest estimation is confirmed (step S121).

Therefore, an unobtrusive response-induction display makes it possible to accurately verify the presence or absence of interest of the user, without an explicit inquiry to the user, such as whether information presentation regarding the recognized subject 20 should be performed.

<3-2. Purpose Estimation Processing>

Next, purpose estimation processing according to the present embodiment will be described with reference to FIGS. 9 and 10. The purpose estimation processing is performed after the accuracy of interest is the threshold Th2 or more (step S118/Yes) and the interest estimation is confirmed (step S121) in the above-described interest estimation processing.

Figure 9:
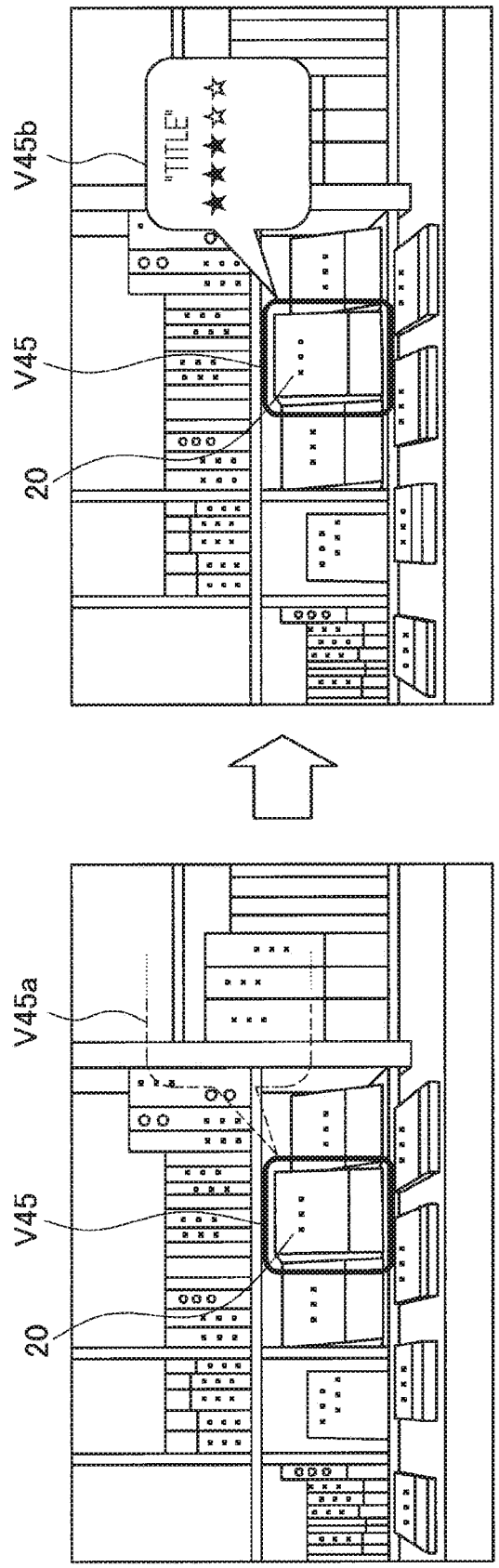
FIG. 9 is an explanatory illustration of an exemplary response-induction display for a subject "book" according to the present embodiment.

First, as illustrated in FIG. 9, the intention estimation unit 130 estimates a purpose for an subject (function in selection of the subject), from a recognized context (situation) and action of the user, and then decides (calculates) the accuracy (accuracy of purpose) with the accuracy decision unit 131 (step S203). A purpose for an subject (function in selection of the subject) means that the user has indicated interest in a subject with what purpose (in a narrow sense of intention), and there are assumed to be various functions performable on the system side, for example, presentation of information associated with the subject, or control of an apparatus if the subject is the apparatus, such as a television or an air conditioning. Furthermore, the accuracy of purpose indicates the likelihood of an estimated purpose, and is calculated from a context (situation) and action of the user.

Next, the response-induction determination unit 150 decides whether or not the accuracy of purpose is a predetermined threshold Th3 (e.g., 1.0) or more (step S206).

Next, in a case where the accuracy of purpose is less than the threshold (step S206/No), the response-induction determination unit 150 acquires, as a candidate, an estimated purpose exceeding a predetermined third threshold Th4 (e.g., 0.4), in List (step S209). An estimated purpose is estimated with the intention estimation unit 130 as described above, and the accuracy of purpose is calculated. An unclear case, however, arises what to present for existence of a plurality of pieces of presentation information associated with a subject. Thus, the accuracy of purpose can be calculated for the plurality of pieces of presentation information as estimated purposes. For example, for the subject as a "DVD", the presentation information includes "detailed information" and "a trailer (short movie for advertisement, preview)", so that an unclear case arises which should be displayed.

Next, the response-induction determination unit 150 sorts the List of estimated purposes in descending order of the accuracy of purpose (step S212), and in a case where the List is not Null (step S215/No), selects a candidate x in order from the top (step S218). Note that it is also assumed that a plurality of candidates x each having the highest accuracy of purpose may exist.

Subsequently, the response-induction determination unit 150 sets the degree of recognition (here, visibility) in accordance with the accuracy of purpose (step S221). The visibility may be expressed numerically, or may be expressed in stages, as described above.

Next, in a case where a plurality of candidates x exists and a simultaneous effect is applicable to the candidates x (step S224/Yes), the response-induction determination unit 150 adjusts the position of each response-induction display in accordance with the degree of recognition, and the response-induction control unit 160 simultaneously performs the plurality of response-induction displays corresponding to the plurality of candidates x (step S227).

On the other hand, for a single candidate x, or in a case where although a plurality of candidates x exists and a simultaneous effect is inapplicable to the candidates x (step S224/No), the response-induction control unit 160 performs a response-induction display in accordance with the degree of recognition for one candidate x (step S227). For a plurality of candidates x, the response-induction determination unit 150 may adjust the timing of response-induction displays to sequentially perform the response-induction displays. For example, for music reproduction as an estimated purpose, a simultaneous effect is inapplicable. Thus, an effect may be applied to the volume and the music may be sequentially played with small sound to observe a response of the user.

Next, in a case where an expected response (positive response such as gazing) to the response-induction display has been obtained from the user (step S242/Yes), the accuracy decision unit 131 of the intention estimation unit 130 positively updates the accuracy of purpose (step S260).

Next, in a case where the accuracy of purpose is the threshold Th3 or more (step S263/Yes), returning back to FIG. 7, the intention estimation unit 130 confirms the purpose estimation (step S236), and performs the confirmed purpose (function) (step S239). For example, the intention estimation unit 130 performs functions such as presentation of detailed information regarding a book, presentation of detailed information regarding a DVD, reproduction of a trailer of a DVD, or reproduction of the music.

On the other hand, in a case where an expected response has not been obtained (step S242/No) and a rejection response has been indicated (step S245/Yes) or a certain period of time has elapsed (step S248/Yes), the response-induction determination unit 150 eliminates a selected candidate x from the List (step S266), and repeats the processing from step S215. In other words, the response-induction determination unit 150 selects a candidate x having the next highest accuracy and similarly performs a response-induction display.

Furthermore, in a case where no response has been indicated (step S245/No), until a certain period of time elapses (step S248/No), the accuracy decision unit 131 negatively updates the accuracy of purpose (step S251).

Then, in accordance with the update of the accuracy of purpose, the response-induction determination unit 150 resets the degree of recognition according to the accuracy of purpose (step S254), and updates the response-induction display in accordance with the change in the degree of recognition (step S257). As a result, when the accuracy of purpose increases due to a positive response, the degree of recognition also increases. Thus, for expression of the degree of recognition in stages, the pieces of presentation information gradually increase. On the other hand, in a case where no rejection response has been indicated and no positive response has been indicated particularly, the accuracy of purpose decreases with elapse of a period of time and the degree of recognition decreases. Thus, for expression of the degree of recognition in stages, the pieces of presentation information gradually decrease and finally fade out with transparency effect. As a result, staged information presentation or slight presentation, without an explicit inquiry for what purpose to the user, makes it possible to confirm a user intention while observing a response of the user.

Here, exemplary displays of a response-induction display in the above-described purpose estimation processing will be described with reference to FIGS. 9 to 12. Here, as an example, a case of a subject "book" (a single purpose candidate) and a case of "DVDs" (a plurality of purpose candidates) each will be described. Furthermore, all of FIGS. 9 to 12 illustrate the view of the user seen through the display units 15a while the user is wearing a glasses-type wearable device (information processing apparatus 1) as illustrated in FIG. 1. Thus, a response-induction display indicates a virtual object to be displayed corresponding to a subject (real object).

(Exemplary Displays of Subject "Book")

Figure 10:
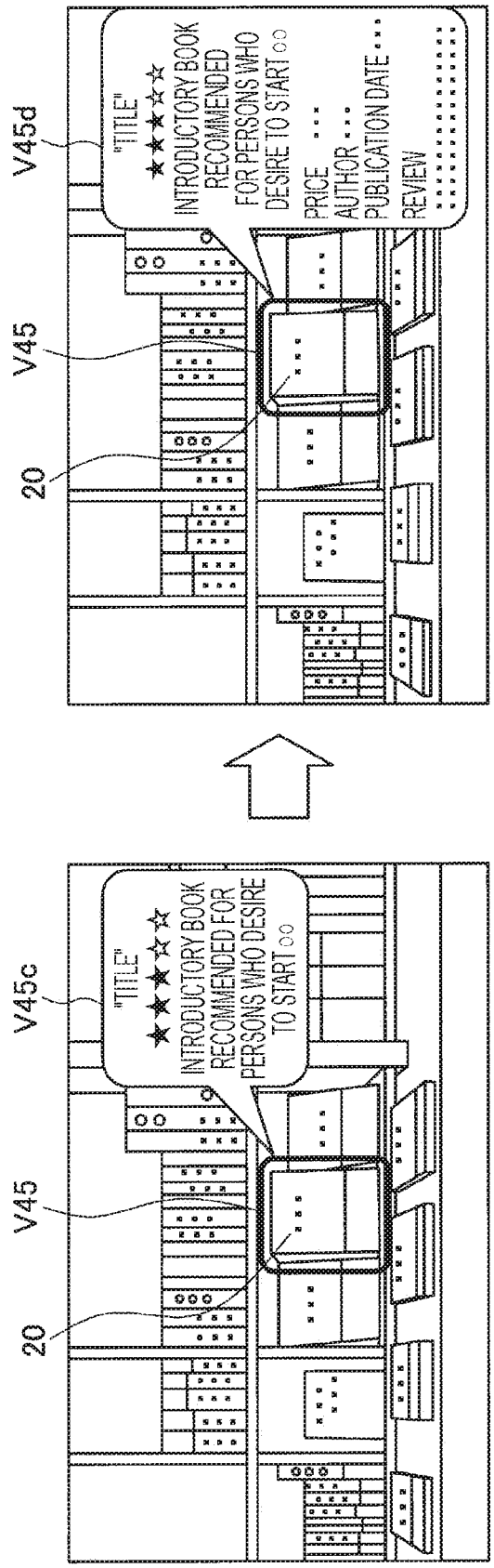
FIG. 10 is an explanatory illustration of an exemplary response-induction display for the subject "book" according to the present embodiment.

FIGS. 9 and 10 are illustrations of exemplary displays of a subject "book". As illustrated on the left side of FIG. 9, for example, in a bookstore, in a case where the user walks with the line-of-sight toward a book (a subject 20: real object) but the walking speed has no change, a lower decision is given to the accuracy of interest (e.g., 0.5), and a display V45 that makes perception of the subject 20 and a slight balloon display V45a are displayed as response-induction displays (corresponding to step S127 in the interest estimation processing described with reference to FIG. 4).

Next, after the user indicates a positive response to gaze at the balloon display V45a (corresponding to step S130 in the interest estimation processing described with reference to FIG. 4), when the visibility of the balloon display V45a is gradually increased and the interest estimation is confirmed (corresponding to step S121 in the interest estimation processing described with reference to FIG. 4), presentation information associated with the subject 20 is displayed in stages as illustrated on the right side of FIG. 9 and the left side of FIG. 10 (steps S230 and S257 in FIG. 7). In other words, first, as illustrated on the right side of FIG. 9, a display V45b having a balloon indicating a title and an evaluation therein is displayed, as information associated with the subject 20.

Next, in a case where the walking speed is slower with the line-of-sight of the user toward a product (or the display V45b), the action is judged as a positive response, and the accuracy of purpose (purpose of desire to see detailed information) is updated positively (e.g., 0.7). Thus, the visibility also increases, and a display V45c including an overview (e.g., "Introductory book recommended for persons who desire to start ○○") is displayed as a display at the next stage.

Then, in a case where the user stops in front of the product, the accuracy of purpose is further updated positively (e.g., 1.0) because the action is a positive response, and in a case where the accuracy of purpose is the predetermined threshold Th3 (e.g., 1.0) or more, the purpose estimation is confirmed (corresponding to step S236 in FIG. 7), and a function of presentation with the detailed information is performed (corresponding to step S239 in FIG. 7). In other words, as illustrated on the right side of FIG. 10, a display 45d including the title, the evaluation, the overview, and detailed information (e.g., evaluation and details of review) is displayed.

(Exemplary Displays of Subject "DVD")

Figure 11:
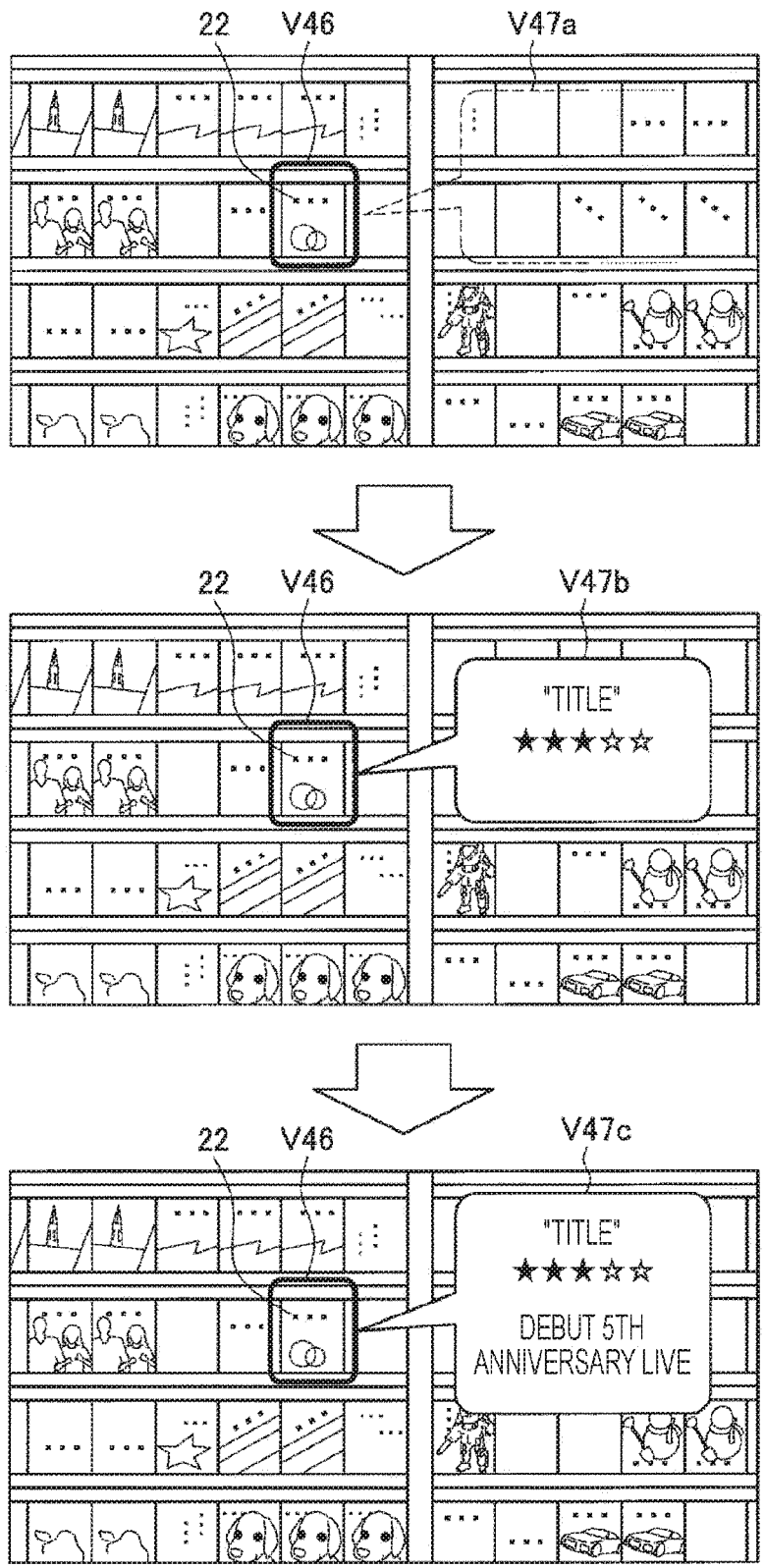
FIG. 11 is an explanatory illustration of an exemplary response-induction display for a subject "DVD" according to the present embodiment.
Figure 12:
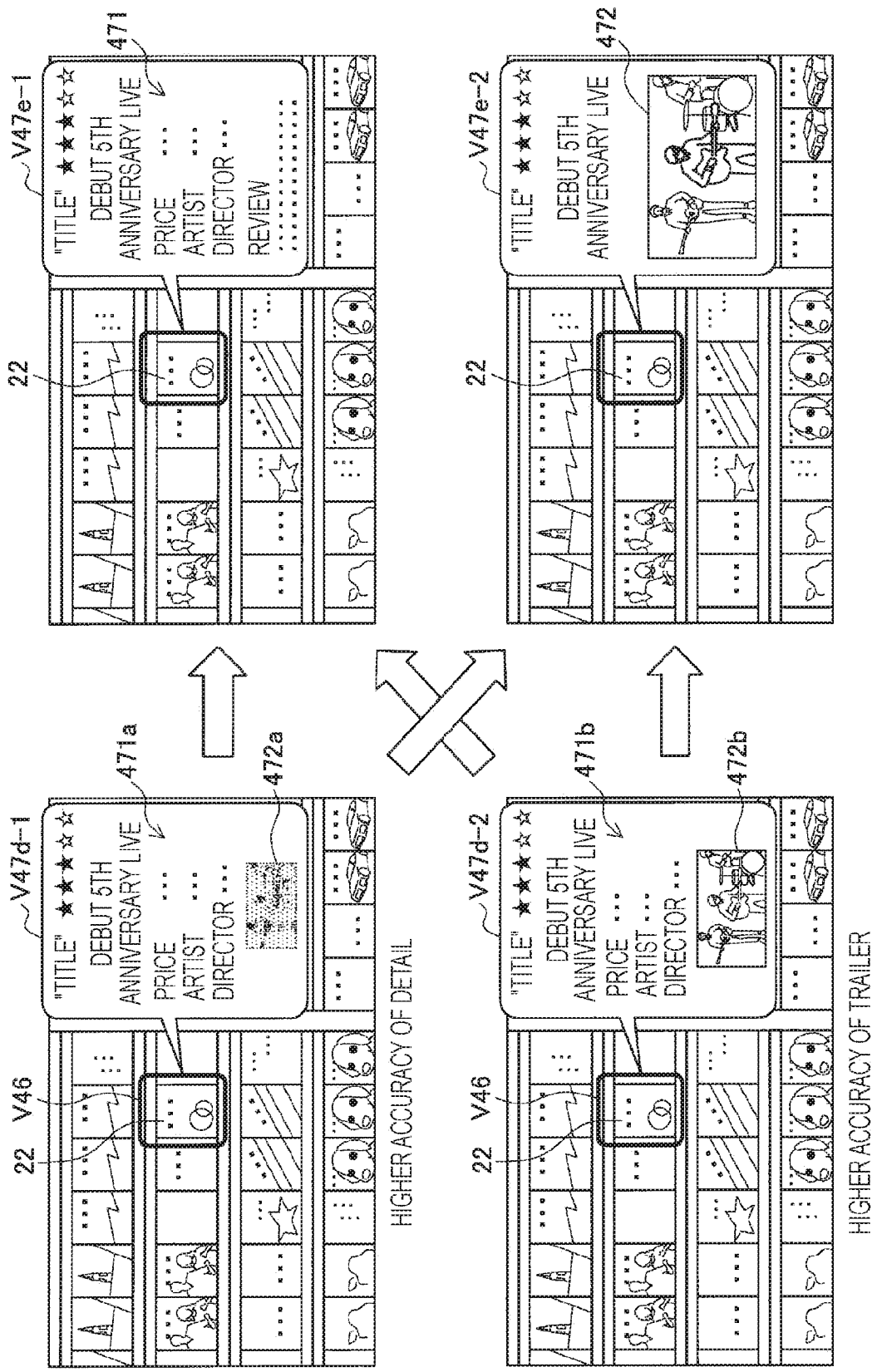
FIG. 12 is an explanatory illustration of an exemplary response-induction display for the subject "DVD" according to the present embodiment.

FIGS. 11 and 12 are illustrations of exemplary displays of a subject "DVD". As illustrated in the upper part of FIG. 11, for example, in a DVD shop, in a case where the user walks with the line-of-sight toward a DVD (a subject 22: real object) but the walking speed has no change, a lower decision is given to the accuracy of interest (e.g., 0.5), and a display V46 that makes perception of the subject 22 and a slight balloon display V47a are displayed as response-induction displays (corresponding to step S127 in the interest estimation processing described with reference to FIG. 4).

Next, after the user indicates a positive response to gaze at the balloon display V47a (corresponding to step S130 in the interest estimation processing described with reference to FIG. 4), when the visibility of the balloon display V47a is gradually increased and the interest estimation is confirmed (corresponding to step S121 in the interest estimation processing described with reference to FIG. 4), presentation information associated with the subject 22 is displayed in stages as illustrated in the middle and lower parts of FIG. 11 (S230 and S257 in FIG. 7). In other words, first, as illustrated in the middle part of FIG. 11, a display V47b having a balloon indicating a title and an evaluation therein is displayed, as information associated with the subject 22.

Next, in a case where the walking speed slows with the line-of-sight of the user toward a product (or the display V47b), the action is judged as a positive response, and the accuracy of purpose (purpose of desire to see detailed information or a trailer) is updated positively (e.g., 0.7). Thus, the visibility also increases, and a display V47c including an overview (e.g., "Debut 5th anniversary live") is displayed as a display at the next stage.

Then, in a case where the user stops in front of the product, the accuracy of purpose is further updated positively (e.g., 0.8) because the action is a positive response. Here, for existence of a plurality of functions such as "presentation of detailed information" and "reproduction of a trailer" included in the function of presenting information associated with the subject 22, a case is assumed in which the purpose of the user is unclear whether browsing of the detailed information or browsing of the trailer and a plurality of estimated purposes ("presentation of detailed information" and "reproduction of a trailer") exists.

In this case, a simultaneous effect is applicable to each purpose candidate. Thus, the information processing apparatus 1 displays a response-induction display V47d applied with an effect on the basis of the visibility set in accordance with the accuracy of each estimated purpose. For example, in a case where, from a context (situation) or action recognition of the user (e.g., line-of-sight), a decision is made that the purpose in detailed information presentation has a higher accuracy than the accuracy of the purpose in trailer presentation, as illustrated in the upper left of FIG. 12, a display V47d-1 is displayed applied with an effect so as to display detailed information 471a larger and a trailer image 472a smaller.

On the other hand, in a case where a decision is made that the trailer presentation purpose has a higher accuracy than the accuracy of the purpose in detailed information presentation, as illustrated in the lower left of FIG. 12, a display V47d-2 is displayed applied with an effect so as to display detailed information 471b smaller and a trailer image 472b larger.

Then, in a case where, after the line-of-sight of the user focuses on the detailed information 471b, the accuracy of the purpose in detailed information presentation is updated positively (e.g., 1.0) and is the predetermined threshold Th3 or more (e.g., 1.0), the purpose estimation is confirmed (corresponding to step S236 in FIG. 7) and a function of presenting the detailed information is performed (corresponding to step S239 in FIG. 7). In other words, as illustrated in the upper right of FIG. 12, a display 47e-1 including the title, the evaluation, the overview, and detailed information (e.g., evaluation and details of review) 471 is displayed.

On the other hand, in a case where, after the line-of-sight of the user focuses on the trailer image 472b, the accuracy of the purpose in trailer presentation is updated positively (e.g., 1.0) and is the predetermined threshold Th3 or more (e.g., 1.0), the purpose estimation is confirmed (corresponding to step S236 in FIG. 7) and a function of reproducing the trailer is performed (corresponding to step S239 in FIG. 7). In other words, as illustrated in the lower right of FIG. 12, a display 47e-2 including the title, the evaluation, the overview, and a trailer reproduction image 472 is displayed.

Note that in a case where the line-of-sight of the user shifts from the detailed information 471a to the trailer image 472a in the middle, when the accuracy of the purpose in trailer presentation is increased and the purpose in trailer presentation is confirmed, as illustrated in the lower right of FIG. 12, the display 47e-2 including the title, the evaluation, the overview, and the trailer reproduction image 472 is displayed. Furthermore, similarly, in a case where the line-of-sight of the user shifts from the trailer image 472b to the detailed information 471b in the middle, when the accuracy of the purpose in detailed information presentation is increased and the purpose in detailed information presentation is confirmed, as illustrated in the upper right of FIG. 12, the display 47e-1 including the title, the evaluation, the overview, and the detail information (e.g., evaluation and details of review) 471 is displayed.

<<4. Case Of Plurality of Subjects>>

A subject for interest estimation may be estimated from the line-of-sight and face orientation of the user, and furthermore the subject may be specified after the effective range of the line-of-sight is determined, or may be estimated from movement of the line-of-sight of the user before interaction. For existence of a plurality of candidates for targets of interest estimation, the information processing apparatus 1 can specify a subject with, for example, the method illustrated in FIG. 13 or 14.

Figure 13:
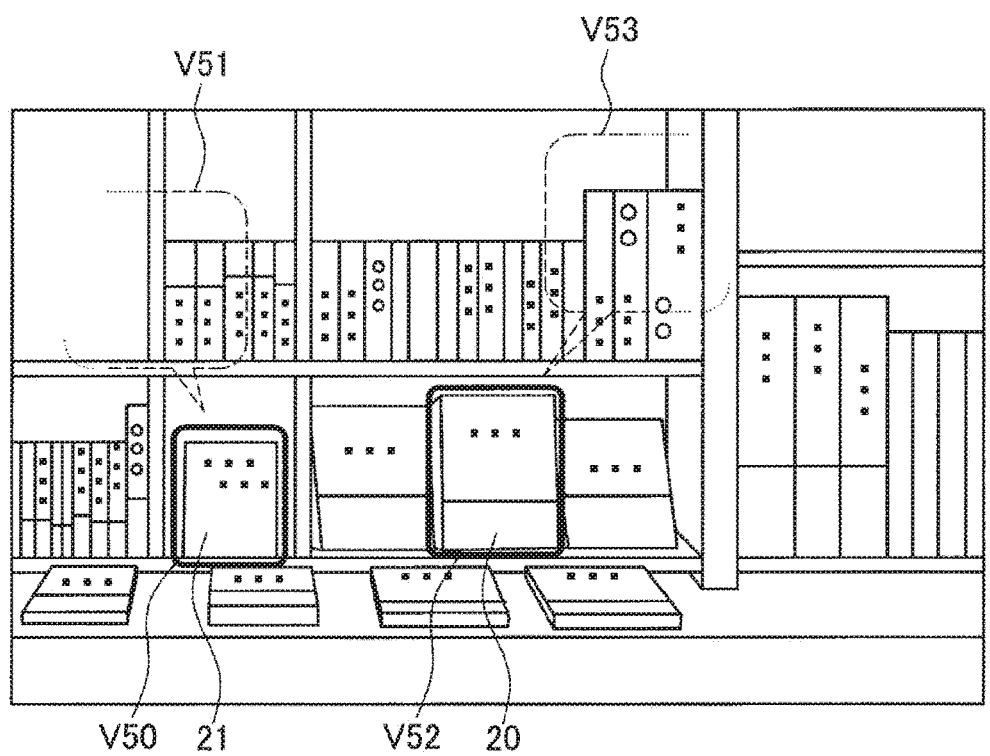
FIG. 13 is an explanatory illustration of an exemplary user-intention grasping method for existence of a plurality of subjects (real objects) to be candidates for interest estimation according to the present embodiment.

FIG. 13 is an explanatory illustration of an exemplary user-intention grasping method for existence of a plurality of subjects to be candidates for interest estimation. As illustrated in FIG. 13, in a case where a subject 20 and a subject 21 each are recognized as a target candidate of interest estimation, the information processing apparatus 1 displays, for the subjects, a display V50 and a display V52 for causing the user to perceive the subjects, and a balloon display V51 and a balloon display V53 that make an intuitive grasp that information is to be presented with AR. Then, in accordance with the line-of-sight or face orientation of the user, the subject at which the user gazes is confirmed as an interest target. As a result, even in a case where a subject exists in a close place and an accurate decision cannot be made from the line-of-sight of the user, for example, mutual remote display of the balloon display V51 and the balloon display V53 allows facilitative decision that which the line-of-sight of the user is directed to.

Note that in a case where a subject is a virtual object, change of a plurality of virtual objects, in location and size, allows facilitative decision that which the line-of-sight of the user is directed to. For example, as illustrated in FIG. 14, for a virtual object V55 and a virtual object V56 each are avatars, in a case where it is unclear that which virtual object the user indicates interest in, the virtual object V55 and the virtual object V56 may be walked naturally to take distance mutually. This arrangement leads to understanding that which virtual object the user gazes at, and allows performance of a function of the subject (e.g., come close and talk to the user, and notify the user of a message from a different party), as illustrated on the right side of FIG. 14.

<<5. Other Exemplary Functions>>

The present embodiment described above uses, as an example, the case where a function to be performed is "presentation of information associated with a subject". The present embodiment, however, is not limited to the case, and makes it possible to more accurately grasp a user intention without an explicit inquiry, in performance of various functions. Here, grasp of a user intention (response-induction control) during performance of a different function will be described below.

(Control of Television Apparatus)

For example, in a case where the user in a living room watches television and indicates interest in the television (subject), purpose estimation as described below can be performed from a context (situation).

Case where the power of the television is off . . . Power on

Case where the power of the television is on . . . Desire to turn off the power, desire to change the volume, desire to change the channel, and the like.

Figure 15:
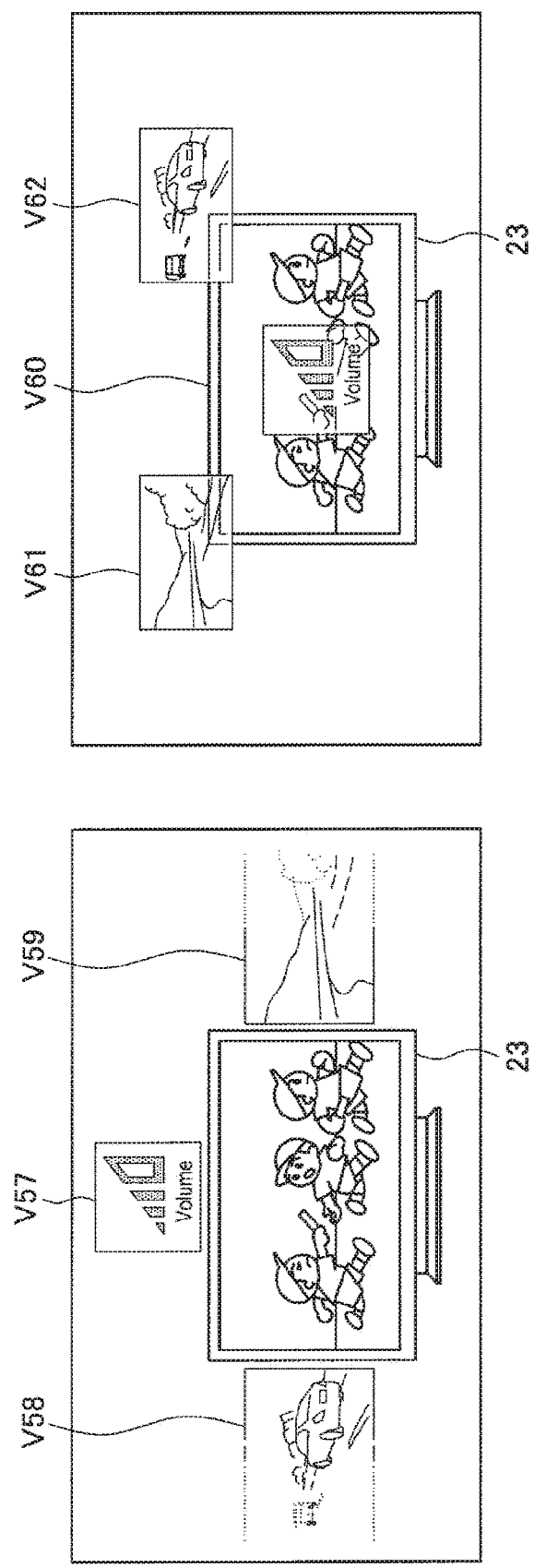
FIG. 15 is an illustration of an exemplary response-induction display during viewing of television according to the present embodiment.

In the above, specifically in a case where the power of the television is on, grasping is required due to the existence of a plurality of purpose candidates. For example, in a case where the user stands up from a sofa and intends to leave the room, the user is highly likely to intend turning off the power, and thus the accuracy of purpose is calculated higher. On the other hand, in a case where the user is sitting on a sofa and watching television, for a decision is made, from a context or an action of the user, that the volume or the channel is likely to be changed, grasping of purpose is performed as illustrated in FIG. 15. FIG. 15 is an explanatory illustration of an exemplary response-induction display during viewing of television according to the present embodiment.

The example illustrated on the left side of FIG. 15 exemplifies a case where the purpose in changing the channel has a higher accuracy than the accuracy of the purpose in changing the volume. Broadcast images V58 and V59 of the previous and subsequent channels are slightly displayed with AR and a volume-adjustment images V57 is displayed with AR above a television 23 (real object). For example, in a case where the line-of-sight of the user focuses on the broadcast image V58, the purpose estimation is confirmed, and control is performed so as to switch to a channel corresponding to the broadcast image V58.

The example illustrated on the right side of FIG. 15 exemplifies a case where the purpose in changing the volume has a higher accuracy than the accuracy of the purpose in changing the channel. Broadcast images V61 and V62 of the previous and subsequent channels are slightly displayed with AR with a small size above the television 23 (real object) and a volume-adjustment image V60 is superimposed on the screen of the television 23 (real object).

(Control of Voice Agent Device)

Furthermore, for a voice agent device as an interest subject for the user, a number of purposes (functions of the voice agent device) such as music reproduction, schedule confirmation, and weather forecast are estimated. In this case, it is also possible to perform a function after a direct inquiry with the voice agent, for example, "Would you like to play the music?" and "Are you OK with ○○ (song name)?". However, as a user-intention grasping method, performance of a function can be controlled with application of an effect to a piece of music to be reproduced and observation of a response of the user. For example, in a case where the user gazes at the voice agent device, for indication of a positive response by the user in reproduction of a certain piece of music with a small volume, the music is to be reproduced with a normal volume. On the other hand, for indication of a negative response by the user in reproduction of a piece of music with a small volume, the reproduction of the music may fade out and end, and a question from the user (e.g., "How is the today's weather?") may be waited.

(Information Presentation According to Mental State of User)

Furthermore, in the above-described embodiment, the case has been described in which the function of presenting information regarding one book in which the user has indicated interest, in a bookstore or the like. The present embodiment, however, is not limited to the case, and information presentation can be performed in accordance with the mental state of the user.

The mental state of the user is estimated, for example, from movement (speed) of the line-of-sight. Specifically, for example, for shift of the line-of-sight at the entire bookshelf at a speed higher than a predetermined value, the user is highly likely to search for the entire bookshelf as "I wonder if there is any good book". Thus, a recommended book may be presented or there may be presented information regarding a list of titles of books to allow the entire view of what kind of books are in the bookshelf.

Furthermore, for slower shift of the line-of-sight to books one by one from the end of the bookshelf, the user is highly likely to search for a specific book. Thus, there may be performed display control of layering background colors so as to hide books eliminated from candidates. Then, at the time of finding a book estimated as the purpose book from movement of the line-of-sight of the user, the detailed information regarding the book may be presented.

<<6. Supplement>>

<6-1. System Configuration>

Figure 16:
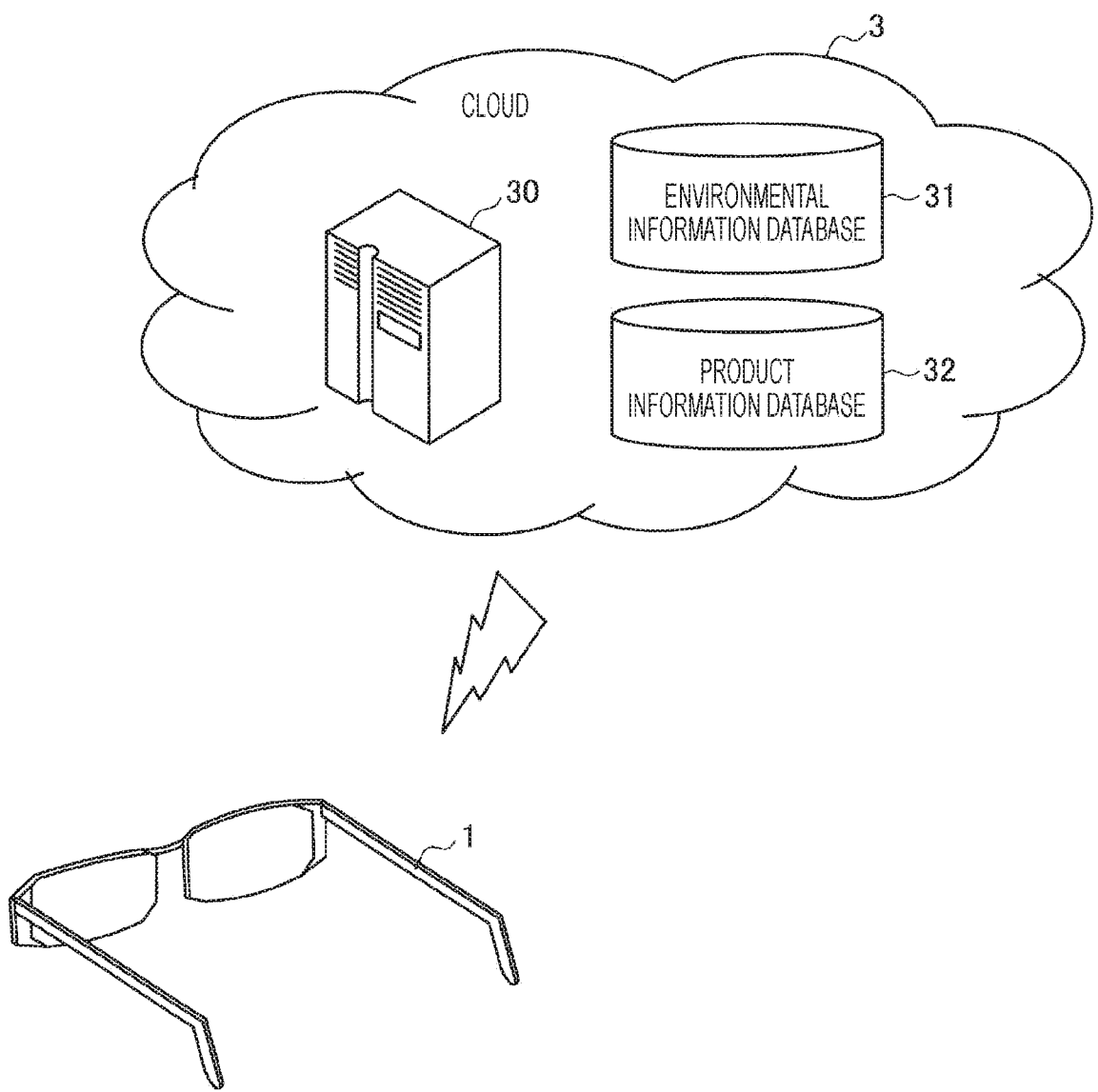
FIG. 16 is an explanatory illustration for the information processing system according to the present embodiment included in a client server system.

The information processing system according to the present embodiment is not limited to the configuration achieved with the information processing apparatus 1 as illustrated in FIGS. 2 and 3, and may have configuration with a client server system as illustrated in FIG. 16.

In an example illustrated in FIG. 16, the information processing apparatus 1 wirelessly performs data communication with a server 30 on the cloud 3. The server 30 has functions corresponding to, for example, the respective functions (the context recognition unit 110, the action recognition unit 120, the intention estimation unit 130, the information-presentation control unit 140, the response-induction determination unit 150, the response-induction control unit 160, and the response judgment unit 170) of the control unit 10 of the information processing apparatus 1 illustrated in FIG. 3. The server 30 performs intention estimation, on the basis of each piece of sensing data and the like transmitted from the information processing apparatus 1, and transmits a response-induction display control signal for grasping an intention, to the information processing apparatus 1.

Figure 17:
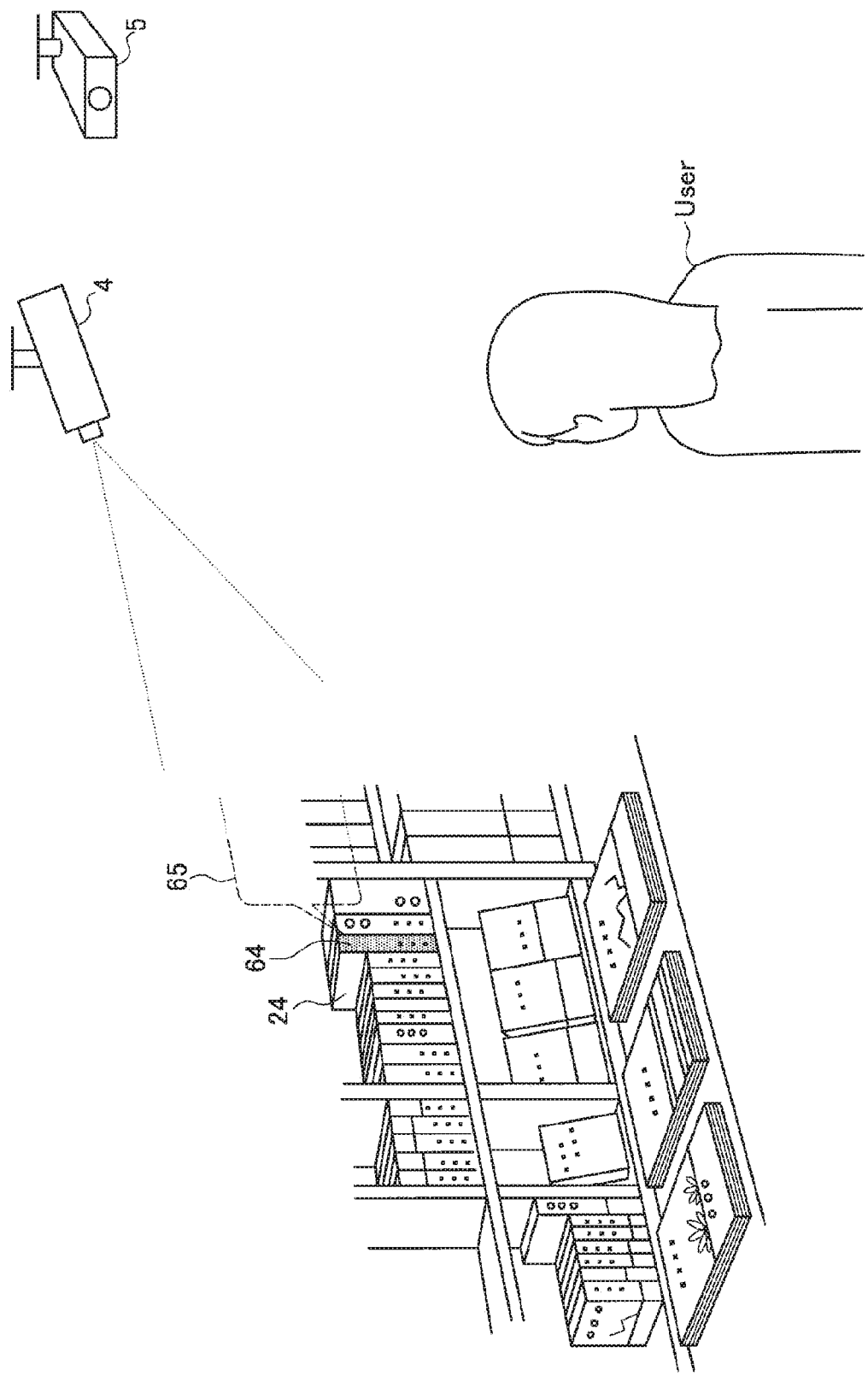
FIG. 17 is an explanatory illustration of an exemplary information presentation with a projector according to the present embodiment.

Furthermore, the information processing system according to the present embodiment is not limited to an example in which a glasses-type wearable as illustrated in FIG. 1 displays information with AR, and for example, a projector may project and display information in the periphery of a subject. For example, as illustrated in FIG. 17, in a case where a projector (another example of the information processing apparatus 1) installed in a bookstore or the like decides a subject 24 (real object) at which the user gazes, from an action of the user captured with a camera 5 installed peripherally, the projector 4 may also project a display 64 for causing the user to perceive the subject 24 and a display 65 for information regarding the subject 24.

<6-2. Other Examples of Presentation Information>

Functions required by the user during shopping or the like are not limited to the functions of presenting detailed information associated with an subject as described above. Various exemplary functions during shopping will be listed below.

Function of presenting where is what area in a store (e.g., overseas manufacturer corner and brand A corner)

Function of presenting recommendations in an area looked currently (recommendation presentation within the visibility range, for example, the second stage at the showcase is recommended, the right half of the third stage is recommended)

Function of reviewing later something on the user's mind (display, with AR, of an image of a subject with clearly looked or unconsciously looked so as to allow comparison with an object looked currently)

Function of generating and presenting an image of the user trying on the clothes that have been displayed in a showcase Presentation of recommended rankings for users in products of a shop Function of presenting the market price of a product Function of presenting product selling points Function of presenting recommended products based on a product on the user's mind Function of presenting recommended products on the basis of further designation for a product (e.g., "similar style to the product," "this point having such a feature," or "color tone like the product") by the user Function of recommending a different product in accordance with a response of the user to a recommended product or the like (e.g., "The product is different.", or "The product inspires me.")

(Control of Information Presentation Timing)

Furthermore, the information processing apparatus 1 according to the present embodiment may present information at a timing at which it is recognized that the user is hard to decide or is searching, on the basis of, for example, movement of the line-of-sight of the user.

Furthermore, the information processing apparatus 1 may present information in a case where a user is looking for a store clerk or in a case where the user is asking "Which do you think is better?".

Furthermore, the information processing apparatus 1 may turn off information presentation in a case where the user is hard to decide during comparison among a plurality of subjects.

(Control of Information Presentation Cancellation)

The information processing apparatus 1 is capable of causing information to fade out, through sensing discomfort (negative response) from the movement of the line-of-sight of the user and the gesture of the user. Thus, even in a case where information is slightly presented at a timing at which the information is not desired to appear, the information can disappear without disturbance.

Furthermore, according to the movement of the line-of-sight of the user, after decision that presented information has been read, the presented information may be controlled to disappear. For example, in a case where shift of an interest target to another is perceived, information may be framed out.

Furthermore, in a case where although having decided on purchase of one product, the user seems to mind a different object again during thinking, detailed information may be framed out, from, for example, the line-of-sight of the user.

The information processing apparatus 1 may not frame out presented information in the middle of reading, even in a case where the user indicates discomfort in the details of the presented information.

Furthermore, the information processing apparatus 1 prevents presented information from being framed out even in a case where the user thinks while reading the presented information. In other words, even though no attention is focused on a target, in a case where attention is not directed to a different target, the information presentation regarding the target may be continued.

<<7. Conclusion>>

As described above, the information processing system according to the embodiment of the present disclosure makes it possible to grasp a user intention more accurately.

The preferred embodiment of the present disclosure has been described above in detail with reference to the accompanying drawings; however, the present technology is not limited to such examples. It is obvious that persons having ordinary knowledge in the technical field of the present disclosure can conceive various alternation examples or modification examples within the scope of the technical idea described in the claims, and it is also naturally understood that such alternation examples or modification examples belong to the technical scope of the present disclosure.

For example, there can be created a computer program for causing the hardware such as the CPU, ROM, and RAM built in the information processing apparatus 1 or the server 30 described above to exhibit the functions of the information processing apparatus 1 or the server 30. Furthermore, there is also provided a computer readable storage medium storing the computer program.

For example, the embodiment of the present disclosure may be interpreted as "an information processing apparatus including at least one processor configured to perform response-induction control of imparting an effect to a target, on the basis of an action-recognition result of the user and change visibility of the effect, in accordance with a response of the user after the performance of the response-induction control".

Furthermore, the effects described in the present specification are merely explanatory or exemplary, and are not limiting. That is, the technology according to the present disclosure can exhibit other effects obvious to those skilled in the art from the description of the present specification, together with or instead of the above effects.

Note that the present technology can also have the following configurations.

(1)

An information processing apparatus including:

an accuracy acquisition unit configured to acquire accuracy information regarding a user intention to a target, the accuracy information being estimated on the basis of an action-recognition result of a user; and a response-induction control unit configured to perform response-induction control of imparting an effect according to the acquired accuracy information, to the target.

(2)

The information processing apparatus according to (1) described above, further including:

an intention estimation unit configured to perform, on the basis of the action-recognition result of the user, interest estimation indicating whether or not the user has indicated interest in the target, as the user intention, and calculate likelihood of the interest estimation, as the accuracy information.

(3)

The information processing apparatus according to (2) described above, in which the intention estimation unit further performs, on the basis of the action-recognition result of the user, purpose estimation indicating what is a purpose for the target in which the user has indicated interest, as the user intention, and calculates likelihood of the purpose estimation, as the accuracy information.

(4)

The information processing apparatus according to (2) or (3) described above, in which the intention estimation unit further estimates the user intention, on the basis of a peripheral situation of the user.

(5)

The information processing apparatus according to any one of (1) to (4) described above, in which the response-induction control unit performs response-induction control of imparting an effect according to a degree of recognition based on the acquired accuracy information, to the target.

(6)

The information processing apparatus according to (5) described above, in which the response-induction control unit controls visibility of information presentation associated with the target in accordance with the degree of recognition, as the effect to be imparted to the target.

(7)

The information processing apparatus according to (5) described above, in which the accuracy information is updated negatively or positively, in accordance with a response of the user to the response-induction control.

(8)

The information processing apparatus according to (7) described above, in which the accuracy information includes at least one of accuracy of interest indicating likelihood of interest in the target by the user or accuracy of purpose indicating likelihood of purpose in selection of the target by the user, and at least one of the accuracy of interest or the accuracy of purpose is decreased or increased, in accordance with the response of the user.

(9)

The information processing apparatus according to (8) described above, in which the response-induction control unit causes the degree of recognition for the effect to decrease, in accordance with the decrease in the at least one of the accuracy of interest or the accuracy of purpose.

(10)

The information processing apparatus according to (8) described above, in which the response-induction control unit causes the degree of recognition for the effect to increase, in accordance with the increase in the at least one of the accuracy of interest or the accuracy of purpose.

(11)

The information processing apparatus according to (2) described above, in which the action-recognition result of the user includes face orientation, line-of-sight detection, hand movement, posture, or action mode.

(12)

The information processing apparatus according to (5) described above, in which the response-induction control unit controls, as the effect to be imparted to the target, a volume during music reproduction by the target, in accordance with the degree of recognition.

(13)

An information processing method, by a processor, including:

acquiring accuracy information regarding a user intention to a target, the accuracy information being estimated on the basis of an action-recognition result of a user; and performing response-induction control of imparting an effect according to the acquired accuracy information, to the target.

(14)

A program for causing a computer to function as:

an accuracy acquisition unit configured to acquire accuracy information regarding a user intention to a target, the accuracy information being estimated on the basis of an action-recognition result of a user; and a response-induction control unit configured to perform response-induction control of imparting an effect according to the acquired accuracy information, to the target.

REFERENCE SIGNS LIST

1 Information processing apparatus
3 Cloud
4 Projector
5 Camera
10 Control unit
110 Context recognition unit
120 Action recognition unit
130 Intention estimation unit
131 Accuracy decision unit
140 Information-presentation control unit
150 Response-induction determination unit
151 Accuracy acquisition unit
160 Response-induction control unit
170 Response judgment unit
11 Communication unit
12 Image pickup unit
13 Sensing unit
14 Input unit
15 Output unit
15a Display unit
16 Storage unit
30 Server
31 Environmental information database
32 Product information database

The invention claimed is:

1. An information processing apparatus, comprising:
a central processing unit (CPU) configured to:
determine a peripheral situation of a user based on at least one of an image of a peripheral place of the user or sound information associated with an environment of the user;
estimate a user intention, with respect to a target, of the user based on the determined peripheral situation of the user;
acquire accuracy information regarding the estimated user intention to the target, based on an action-recognition result of the user;
compare the accuracy information with a threshold;
set a degree of recognition of display information based on the comparison; and
impart an effect to the target based on the set degree of recognition.

2. The information processing apparatus according to claim 1, wherein the CPU is further configured to:
estimate, based on the action-recognition result of the user, a user interest which indicates whether the user is interested in the target, wherein the user intention comprises the user interest; and
calculate a likelihood of the user interest, wherein the accuracy information comprises the calculated likelihood of the user interest.

3. The information processing apparatus according to claim 2, wherein the CPU is further configured to:
estimate, based on the action-recognition result of the user, a user purpose which indicates a purpose of the target with which the user is interested, wherein the user intention further comprises the user purpose; and calculate a likelihood of the user purpose, wherein the accuracy information comprises the calculated likelihood of the user purpose.

4. The information processing apparatus according to claim 1, wherein the CPU is further configured to control visibility of the display information presented in association with the effect of the target, based on the set degree of recognition of the display information.

5. The information processing apparatus according to claim 1, wherein the CPU is further configured to update, one of negatively or positively, the accuracy information based on a response of the user to the imparted effect.

6. The information processing apparatus according to claim 5, wherein the accuracy information includes at least one of an accuracy of interest indicating a likelihood of interest in the target by the user, or an accuracy of purpose indicating a likelihood of purpose in selection of the target by the user, and the CPU is further configured to one of increase or decrease at least one of the accuracy of interest or the accuracy of purpose, based on the response of the user.

7. The information processing apparatus according to claim 6, wherein the CPU is further configured to decrease the degree of recognition based on a decrease in at least one of the accuracy of interest or the accuracy of purpose.

8. The information processing apparatus according to claim 6, wherein the CPU is further configured to increase the degree of recognition based on an increase in at least one of the accuracy of interest or the accuracy of purpose.

9. The information processing apparatus according to claim 2, wherein the action-recognition result of the user includes at least one of face orientation, line-of-sight detection, hand movement, posture, or action mode.

10. The information processing apparatus according to claim 1, wherein the CPU is further configured to control, as the effect imparted to the target, a volume during music reproduction by the target, based on the set degree of recognition.

11. An information processing method, comprising:

determining a peripheral situation of a user based on at least one of an image of a peripheral place of the user or sound information associated with an environment of the user;

estimating a user intention, with respect to a target, of the user based on the determined peripheral situation of the user;

acquiring accuracy information regarding the estimated user intention to the target, based on an action-recognition result of the user;

comparing the accuracy information with a threshold;

setting a degree of recognition of display information based on the comparison; and imparting an effect to the target based on the set degree of recognition.

12. A non-transitory computer-readable medium having stored thereon, computer-executable instructions, which when executed by a computer, cause the computer to execute operations, the operations comprising:

determining a peripheral situation of a user based on at least one of an image of a peripheral place of the user or sound information associated with an environment of the user;

estimating a user intention, with respect to a target, of the user based on the determined peripheral situation of the user;

acquiring accuracy information regarding the estimated user intention to the target, based on an action-recognition result of the user;

comparing the accuracy information with a threshold;

setting a degree of recognition of display information based on the comparison; and imparting an effect to the target based on the set degree of recognition.

* * * * *